(12) United States Patent
McDonald

(10) Patent No.: US 11,465,737 B1
(45) Date of Patent: Oct. 11, 2022

(54) CONFORMAL PYLON/BOOM PROP-ROTORS

(71) Applicant: Joby Aero, Inc., Santa Cruz, CA (US)

(72) Inventor: Robert Alan McDonald, San Luis Obispo, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 174 days.

(21) Appl. No.: 16/818,524

(22) Filed: Mar. 13, 2020

Related U.S. Application Data

(60) Provisional application No. 62/818,071, filed on Mar. 13, 2019.

(51) Int. Cl.
*B64C 27/50* (2006.01)

(52) U.S. Cl.
CPC ..................... *B64C 27/50* (2013.01)

(58) Field of Classification Search
CPC .......... B64C 27/50; B64C 27/22; B64C 11/28
See application file for complete search history.

(56) References Cited

U.S. PATENT DOCUMENTS

| | | | |
|---|---|---|---|
| 2,815,820 A * | 12/1957 | Papadakos | B64C 27/50 416/143 |
| 4,080,922 A | 3/1978 | Brubaker | |
| 5,183,384 A | 2/1993 | Trumbly | |
| 6,622,962 B1 * | 9/2003 | White | B64C 27/26 244/12.3 |
| 8,376,264 B1 | 2/2013 | Hong et al. | |
| 9,694,911 B2 | 7/2017 | Bevirt et al. | |
| 9,896,200 B2 | 2/2018 | Fredericks et al. | |
| 10,336,443 B2 * | 7/2019 | Louis | B64C 27/30 |
| 2016/0031556 A1 * | 2/2016 | Bevirt | B64C 27/30 244/7 A |
| 2018/0229830 A1 | 8/2018 | Foskey et al. | |
| 2019/0016459 A1 | 1/2019 | North et al. | |

FOREIGN PATENT DOCUMENTS

| | | |
|---|---|---|
| EP | 3141474 B1 | 5/2018 |
| EP | 3464061 B1 | 10/2019 |
| RU | 2709944 C2 | 12/2019 |

OTHER PUBLICATIONS

"X-57 Maxwell", NASA, (2017), 3 pgs.
(Continued)

*Primary Examiner* — Nicholas McFall
*Assistant Examiner* — Terri L Filosi
(74) *Attorney, Agent, or Firm* — Schwegman Lundberg & Woessner, P.A.

(57) ABSTRACT

A vertical lift rotor propulsor assembly comprises a boom having a casing with a casing profile and a first propeller blade having a blade profile that corresponds substantially to at least a portion of the casing profile of the casing of the boom. A drive mechanism is at least partially housed within the boom and at the first propeller blade is rotatably mounted to the drive mechanism to be driven thereby. The drive mechanism is to operationally move the first propeller blade between a stowed position in which the first propeller blade is substantially flush with the casing of the boom, and a deployed position in which the first propeller blade is extended a determined distance from the casing of the boom.

16 Claims, 23 Drawing Sheets

(56) References Cited

OTHER PUBLICATIONS

Litherland, Brandon L., et al., "A method for designing conforming folding propellers", 17th AIAA Aviation Technology, Integration, and Operations Conference, (2017), 18 pgs.

Litherland, Brandon, et al., "Modeling Conforming Folding Propellers", NASA OpenVSP Workshop 2017, (Aug. 31, 2017), 32 pgs.

Patterson, Michael, et al., "A Simple Method for High-Lift Propeller", NASA Langley Research Center, (Jan. 5, 2016), 41 pgs.

Patterson, Michael D., et al., "Approach Considerations in Aircraft with High-Lift", 17th AIAA Aviation Technology, Integration, and Operations Conference, (2017), 18 pgs.

Uber, "Fast-Forwarding to a Future of On-Demand Urban Air Transportation Introduction", Uber Elevate, (Oct. 27, 2016), 98 pgs.

\* cited by examiner

CONFORMAL PYLON/BOOM PROP-ROTORS

CLAIM FOR PRIORITY

This application claims the benefit of priority of U.S. Provisional Application Ser. No. 62/818,071, filed Mar. 13, 2019, which is hereby incorporated by reference in its entirety.

BACKGROUND

A vertical take-off and landing (VTOL) aerial vehicle (AV) or aircraft is one that can hover, take off, and land vertically.

For multi-rotor VTOL aircraft, several technical challenges exist with respect to transitioning between cruise and takeoff modes, optimizing lift/drag (L/D) ratio for fuel efficiency, and failure scenario handling. For example, some existing VTOL aircraft may use a distributed set of fixed propulsors and/or tilting propulsors that rotate in the direction of flight to provide both vertical lift and forward thrust. While this approach reduces motor weight and aircraft drag, the articulating motor and propulsors result in increased design complexity.

Certain VTOL aircraft designs may use different sets of propulsors or rotors to provide during takeoff/landing modes and cruise mode. However, particularly during cruise mode, the propellers of inactive propulsors may contribute drag.

Accordingly, certain designs have been proposed that stow propeller blades when a particular rotor or propulsor is not in use so as to reduce drag. Some designs are described in Litherland et al., "A Method for Designing Conforming Folding Propellers," which describes a number of folding-blade configurations that conform to a nacelle surface when the stowed. The propellers described in this paper are so-called "high-lift propellers," which act as highlift devices by accelerating air over a wing on account of being positioned ahead of a leading edge of such wings. The described highlift propellers are forward thrust propellers. FIG. 11 of this paper shows the following blades in respect of extended and folded/stowed states. As noted by Litherland to reduce cruise drag from the high-lift propeller system, a propeller design that is capable of smooth folding against a nacelle is desired.

Examples of folding propeller applications in aviation include the Joby S22 and S4,3 NASA's, LEAPTech Project, 4 and NASA's GL-10 \Greased Lightning." Also, folding propellers are used extensively in powered gliders such as the Stemme S10, where the propeller blades are stowed within the nose of the fuselage, and the Alisport Silent 2 Electro, 7 where the propeller blades fold back along the nose. More recently, in the remotely operated aircraft market, folding propeller blades (e.g., the Graupner CAM folding propeller) have gained popularity. Historically, folding propellers have been used for marine applications, specifically sailboat auxiliary propulsion, since the 1960s.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

According to some examples, there is provided a vertical takeoff and landing (VTOL) aerial vehicle (AV) (a VTOL AV) having electric propulsors and control systems that seek to minimize design complexity (e.g., through a minimizing component count), while providing a high lift-to-drag (L/D) ratio. Further, the examples seek to provide a VTOL aerial vehicle with a reduced number of points of failure that may result in a catastrophic failure.

Blade element theory (BEM) is used in the design of propellers or rotors and treats each rotor blade as a series of strips that start at a root of the blade and extend out to the tip. When performing aerodynamic analysis, each strip may be considered, from a behavioral perspective, as a two-dimensional isolated section, with these isolated sections being integrated from the root to the top.

Blade element theory is primarily concerned with a cross-section of the blade at a given location. Propeller performance can be adequately predicted based on blade-wise distributions of chord, twist, and design lift coefficient (c, $\theta$, cli))

Key parameters that are considered in blade design include the chords (distance from the leading edge to the trailing edge of the airfoil of a particular section), local twist angle, and design lift coefficient with the chord and the twist angle being designed for a specific blade to provide it with a desired aerodynamic performance. However, other parameters of the blade (e.g., skew, rake and sweep, etc.) may be modified without substantially affecting the aerodynamic performance of the blade element, from a blade element theory perspective. This insight provides the opportunity to set such parameters for noise, packaging, and other factors.

Examples described herein are based on the understanding that the shape of a blade may be tailored to conform to a low drag shape (e.g., a shape conforming to the case of a boom or fuselage), and, when stowed, nestled with such a case (e.g., in a recess) to provide a reduced drag coefficient for an aircraft, without substantially degrading the aerodynamics of the blade. In other words, from a blade element theory perspective, an example blade may be aerodynamically similar to a more conventionally shaped blade, but when appropriately integrated into a boom or pylon (e.g., in a stowed position), the blade may contribute to a much lower drag coefficient for the aircraft as a whole.

Figure 1:
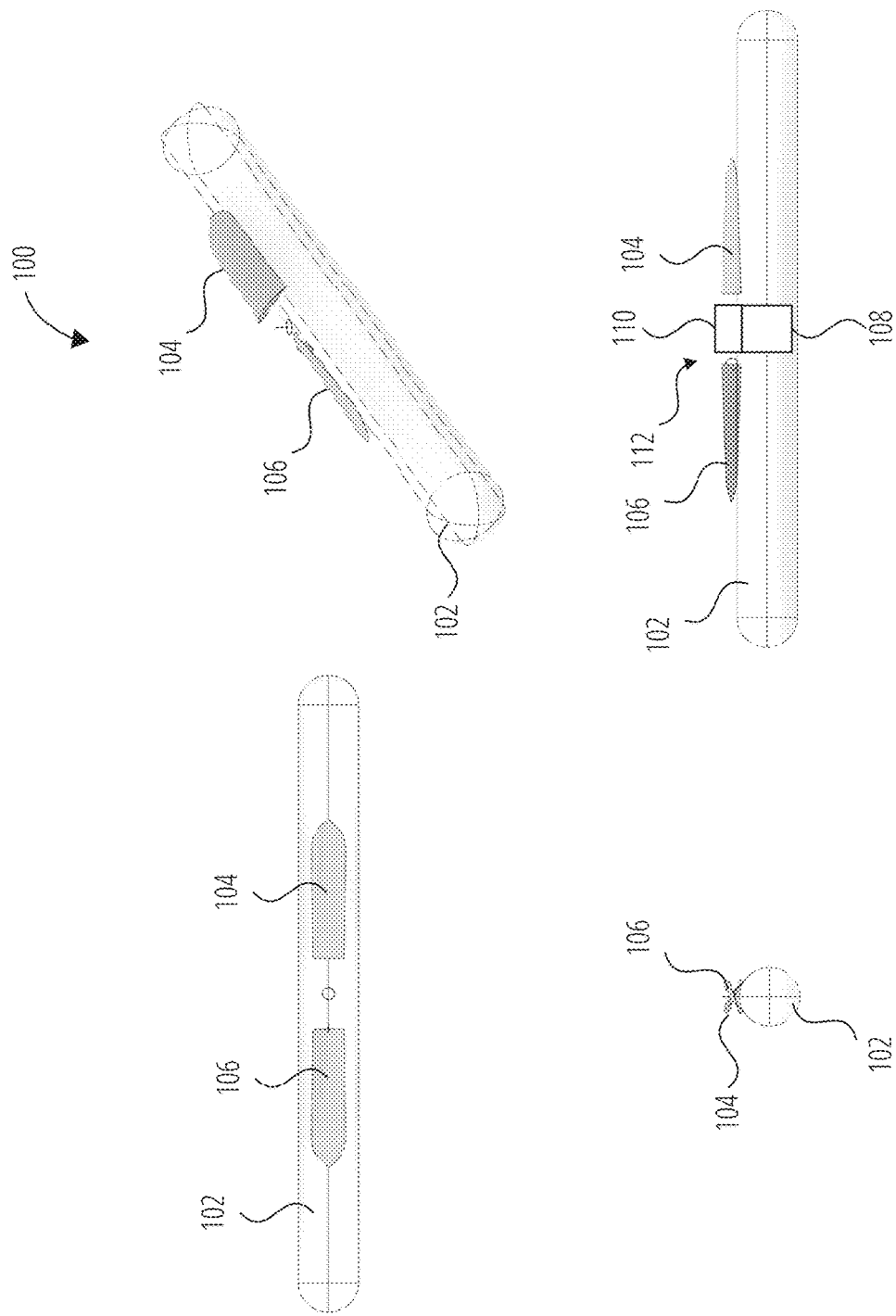
FIG. 1 illustrates a boom assembly 100 in accordance with some examples.

FIG. 1 presents a series of diagrams showing isometric, top, front, and side views of a boom assembly 100, according to a baseline example. The boom assembly 100 includes a boom 102 that is cylindrical in shape but may be constructed to have any variety of shapes in different examples. The boom 102 includes a casing that defines an interior, the casing (or housing) providing an outer surface having a casing profile.

The boom assembly 100 further includes a propulsor which is partially accommodated within the interior of the boom 102, and is mounted to and supported by the boom 102. Specifically, the propulsor includes a propeller having a blade assembly including two blades, namely a propeller blade 104 and a propeller blade 106. The propeller blade 104 and the propeller blade 106 are secured in a diametrically opposing arrangement to a drive mechanism 112 that includes an electric motor 108 and a telescoping driveshaft 110. In other embodiments, a single blade propulsor (e.g., rotor) is provided, including only a single propeller blade 104 secured to the telescoping driveshaft 110.

In the baseline example of FIG. 1, the shapes or profiles of each of the 104 and 106 are such that, when in a partially retracted position such as that shown in the front review, the blades each rest on top of an upper surface of the casing of the boom 102, and protrude above this upper surface. In scenarios in which the blades are stowed within this position (e.g., during cruise mode of an aircraft of which is the boom assembly 100 is a component), it will be appreciated that aerodynamic turbulence and resistance will be generated around each of the blades, which may accordingly impact the aerodynamic efficiency and stability of an aircraft as a whole.

Figure 2:
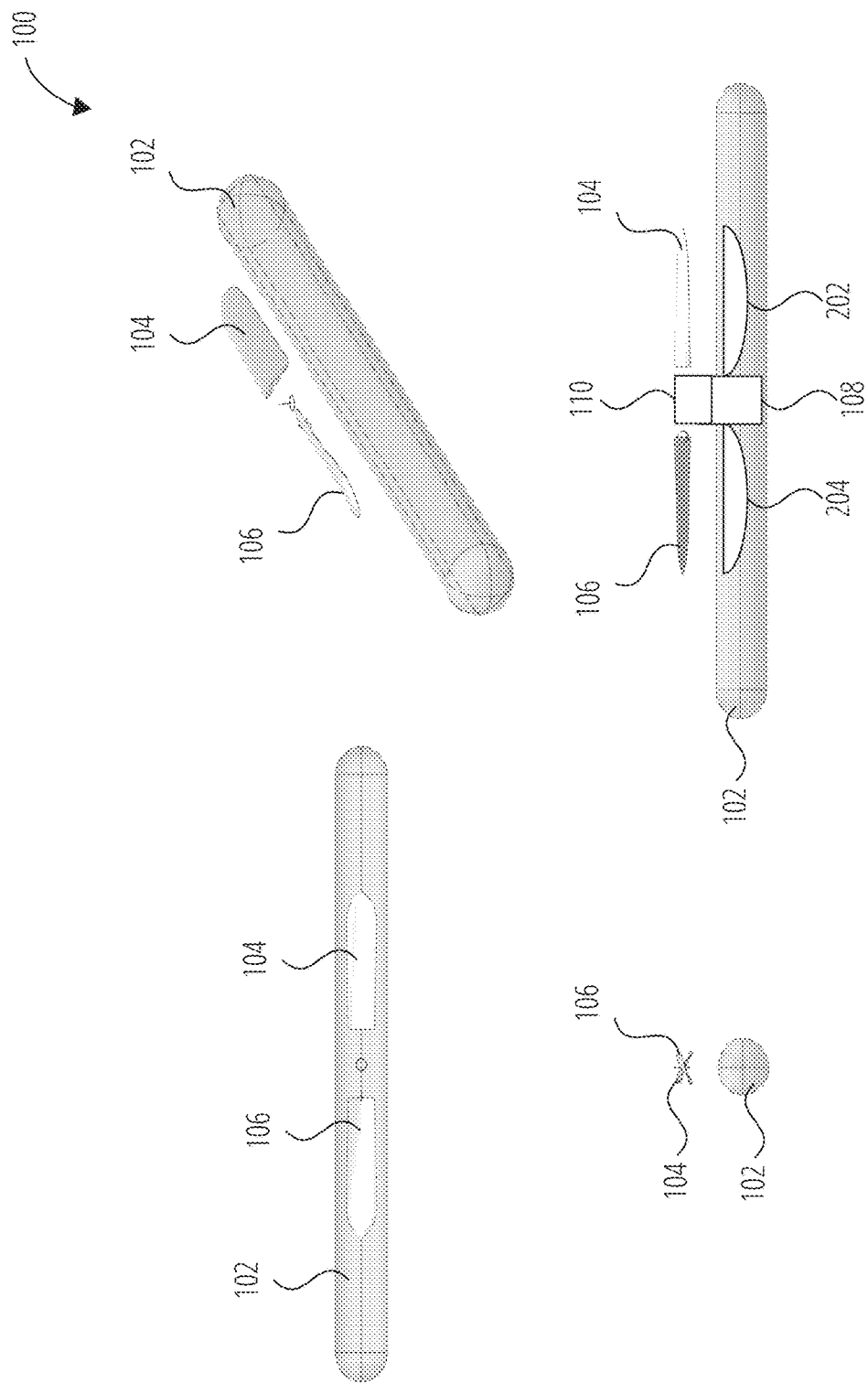
FIG. 2 illustrates a boom assembly 100 in accordance with some examples.

FIG. 2 also shows that respective recesses or cavities for each of the blades (e.g., cavity 202 and cavity 204) may be defined within the casing of the boom 102 to enable the blades to be stored below a primary surface of the casing of the boom 102.

The cavity 202 and the cavity 204 allow the propeller blade 104 and the propeller blade 106 to be retracted to within an interior space of the boom 102 as defined by the casing.

Figure 3:
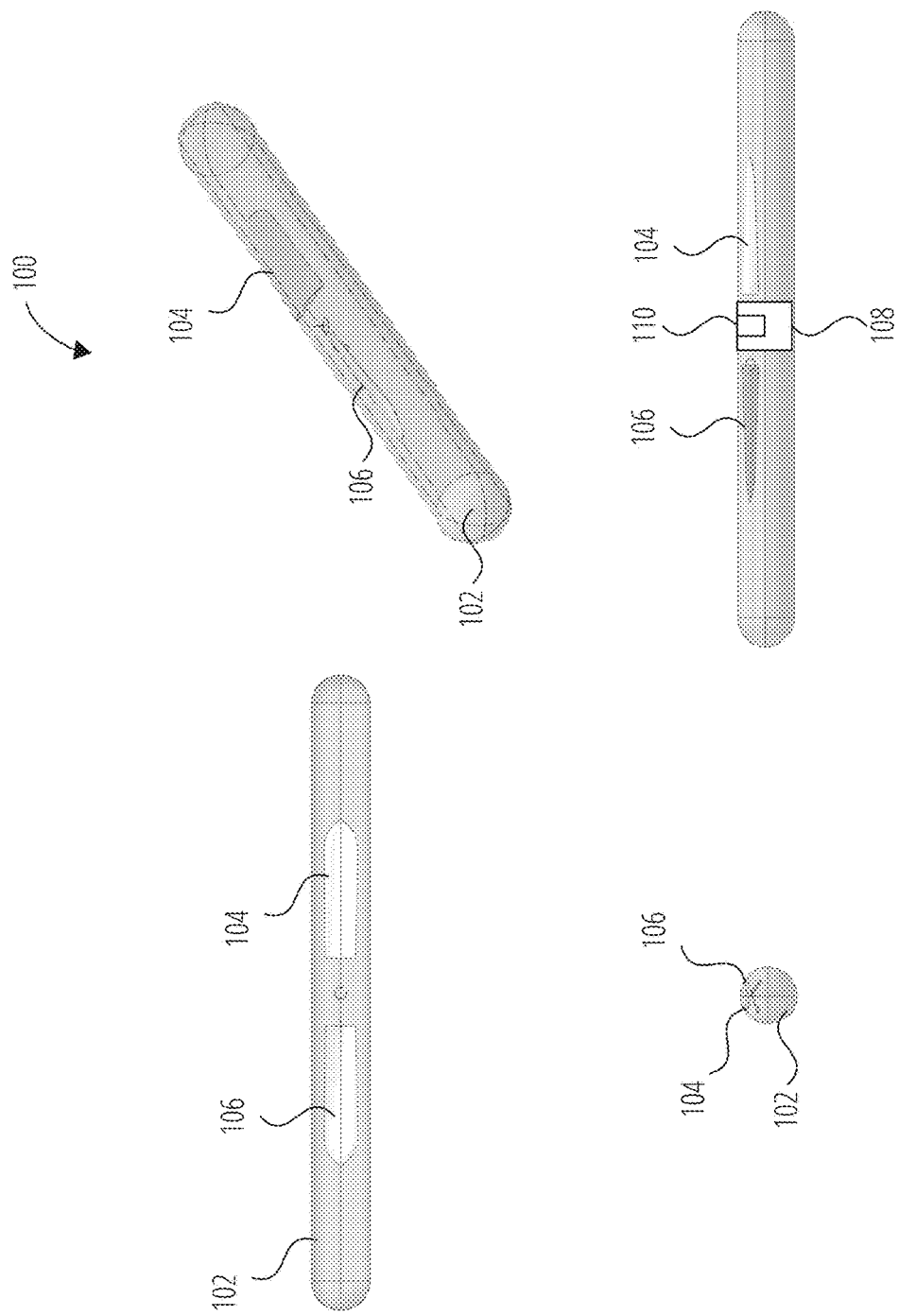
FIG. 3 illustrates a boom assembly 100 in accordance with some examples.

FIG. 3 presents a series of diagrams showing isometric, top, front, and side views of the boom assembly 100, according to the baseline example, in a retracted (or stowed) position. The telescoping driveshaft 110 is fully retracted to pull the propeller assembly below the upper surface of the casing of the boom 102. In some examples, the propeller assembly is retracted into cavities (e.g., the cavity 202 and the cavity 204 shown in FIG. 2) defined in the casing of the boom 102. In FIG. 3, the front view and the side view of the boom assembly 100 clearly show each of the propeller blades accommodated within the interior of the boom 102. This arrangement represents a low-drag stowed position—but requires a substantial cavity (or cavities) in the boom 102 for each blade. This cavity may either cause substantial drag—or may require complex doors to seal the opening. In addition, a substantial cavity presents a substantial structural challenge, as much of the cross-section of the boom is not available for structure in this case.

Figure 4:
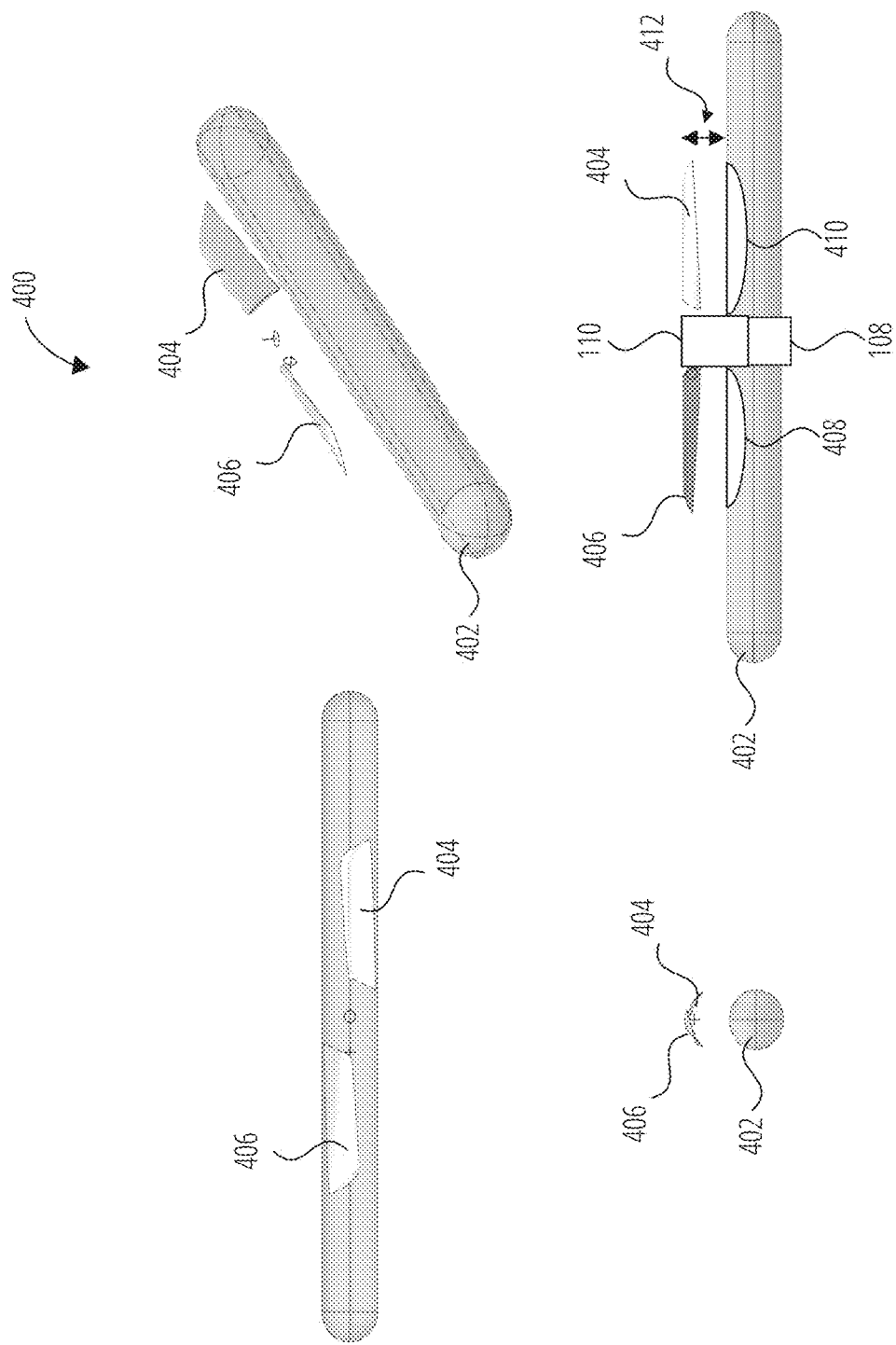
FIG. 4 illustrates a boom assembly 400 in accordance with some examples.

FIG. 4 presents a series of diagrams showing isometric, top, front, and side views of a boom assembly 400, according to a conforming example, in a deployed (or extended) position. As with the example shown in FIG. 2, a drive mechanism is at least partially housed within the boom 402, and includes both an electric motor 108 and a telescoping driveshaft 110. The drive mechanism is operationally to move or translate the propeller blade assembly between a stowed position (shown in FIG. 5), in which each of the blade 406 and the blade 410 are substantially flush with the casing of the boom 402, and a deployed position (shown in FIG. 4) in which the blade assembly is raised a determined distance 412 from an upper surface of the casing of the boom 402. The determined distance that a blade is raised from the casing can be equal to or exceed a chord length of the blade.

Specifically, the telescoping driveshaft 110 is extendable to raise the propeller assembly (e.g., a propeller blade 404 and a propeller blade 406) to a determined height above an upper surface of a casing of a boom 402. In this deployed position, the electric motor 108 may be powered to rotate the telescoping driveshaft 110 and the propeller assembly in order to provide vertical lift to an aircraft.

Similar to the example shown in FIG. 2, respective recesses are defined in an upper surface of the casing of the boom 402 (e.g., recess 408 and recess 410).

From the front view shown in FIG. 4, it will be seen that the blade profile of each of the blades 406 and 404, and specifically the profile of a lower surface of each of these blades, corresponds substantially to the profile of the upper surface of the casing of the boom 402. For example, comparing the blade 404 of the conforming example to the blade 104 of the baseline example, the rake, skew and sweep of the blade 404 can be set to achieve this correspondence of profile, without substantially impacting the aerodynamic performance of the blade 404 relative to the blade 104.

Figure 5:
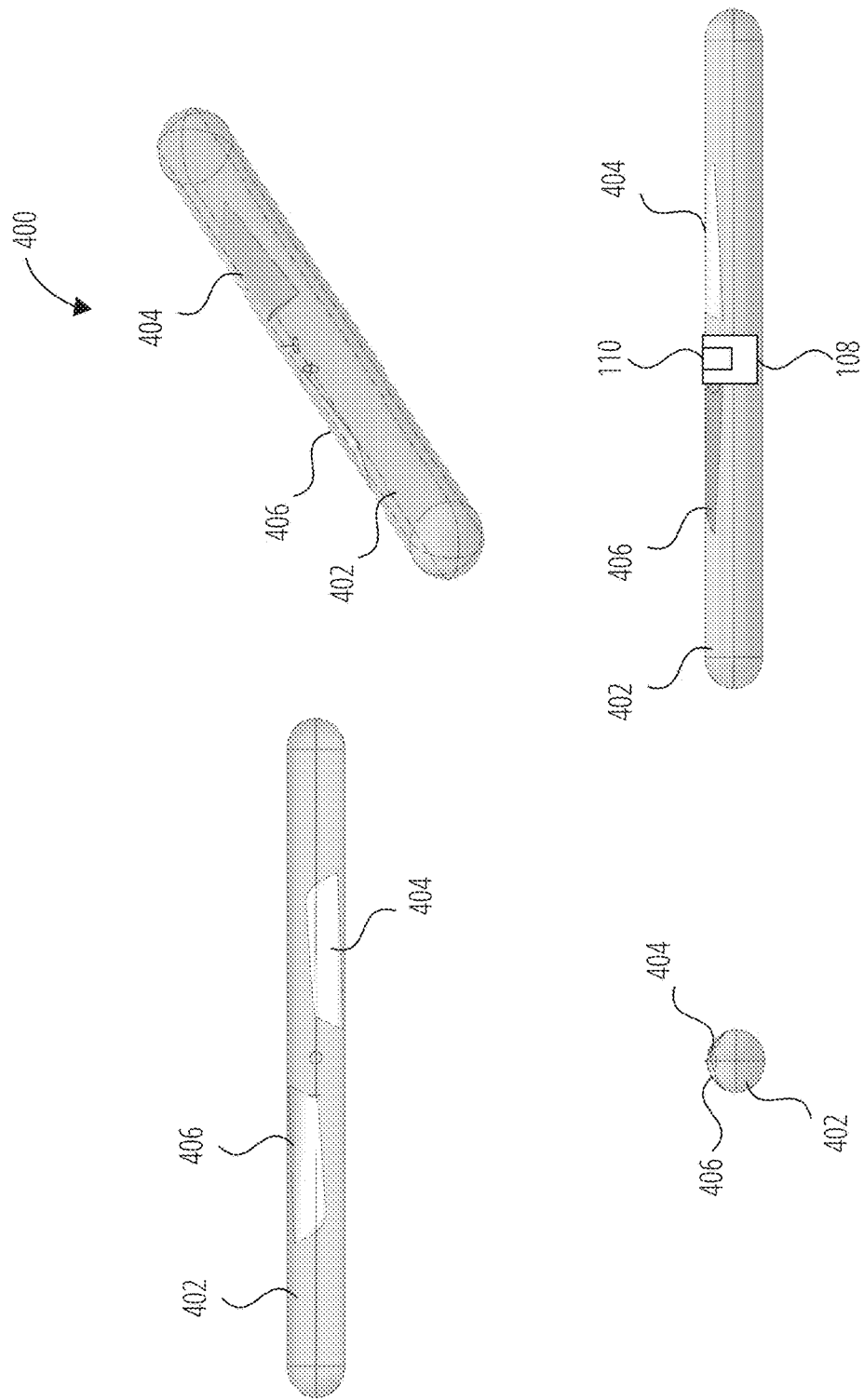
FIG. 5 illustrates a boom assembly 400 in accordance with some examples.

FIG. 5 presents a series of diagrams showing isometric, top, front, and side views of the boom assembly 400, according to the conforming example, in a stowed (or retracted) position. The front and side views show with particular clarity how the blade 404 and the blade 406 rest snugly and substantially flush with an upper surface of the casing of the boom 402 in this stowed position. This substantially flush fitting between the blades and the casing is achieved by a correspondence of profile between the lower surfaces of the blades and an upper surface of the casing of the boom 402. Additionally, the recess 408 and the recess 410 (shown in FIG. 4) contribute to a smooth and substantially flush orientation of the upper surfaces of the casing and the upper surfaces of the blades when in the stowed position. This smooth and substantially flush orientation, it will be appreciated, may actively reduce aerodynamic drag and interference (e.g., turbulence) across this composite upper surface of the boom assembly 400 during cruise mode of an aircraft when the aircraft is moving in a forward direction at high speed.

FIG. 5 also shows that, in the stowed position, the telescoping driveshaft 110 is fully retracted into the interior of the boom 402. In some embodiments, a top end of the drive mechanism (e.g., the driveshaft and/or an electric motor casing) may be shaped to also be substantially flush and present a substantially smooth and continuous upper surface for the boom assembly 400.

Figure 6:
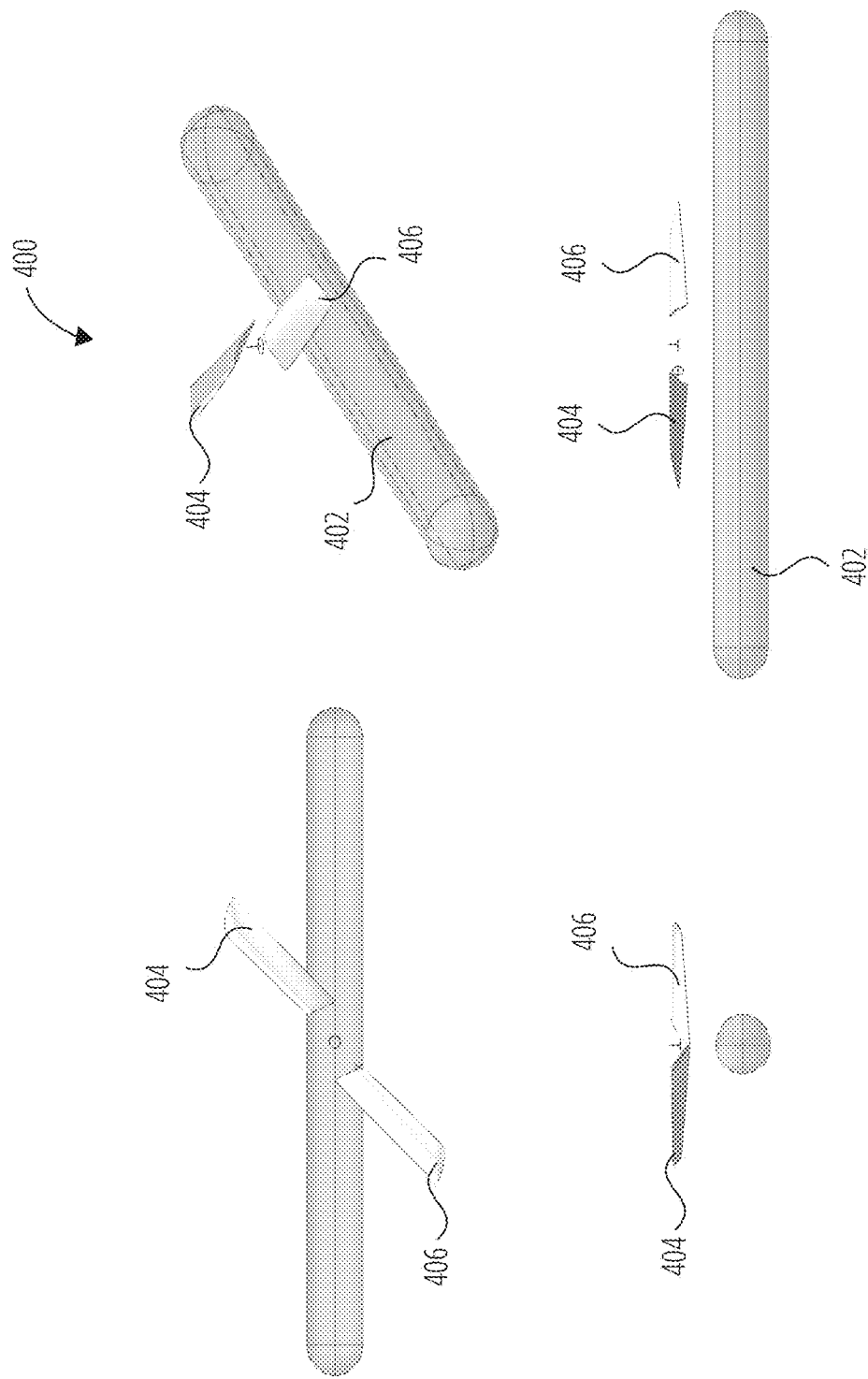
FIG. 6 illustrates a boom assembly 400 in accordance with some examples.

FIG. 6 presents a series of diagrams showing isometric, top, front, and side views of the boom assembly 400, according to the conforming example, in a deployed position, and rotated at a 45° angle.

Figure 7:
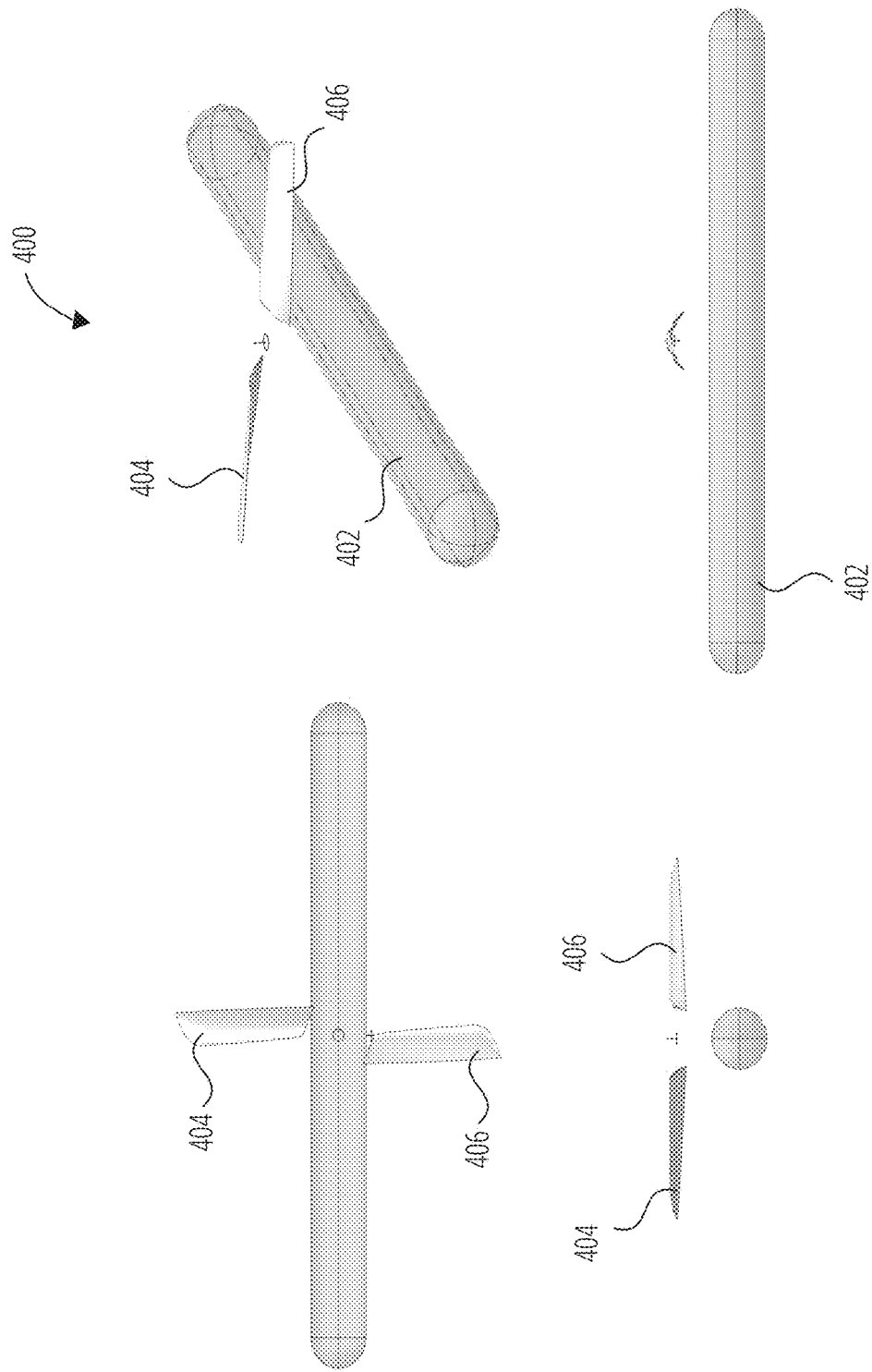
FIG. 7 illustrates an aerial vehicle 1500 in accordance with some examples.

FIG. 7 presents a series of diagrams showing isometric, top, front, and side views of the boom assembly 400, according to the conforming example, in a deployed position and rotated at a 90° angle.

Figure 8:
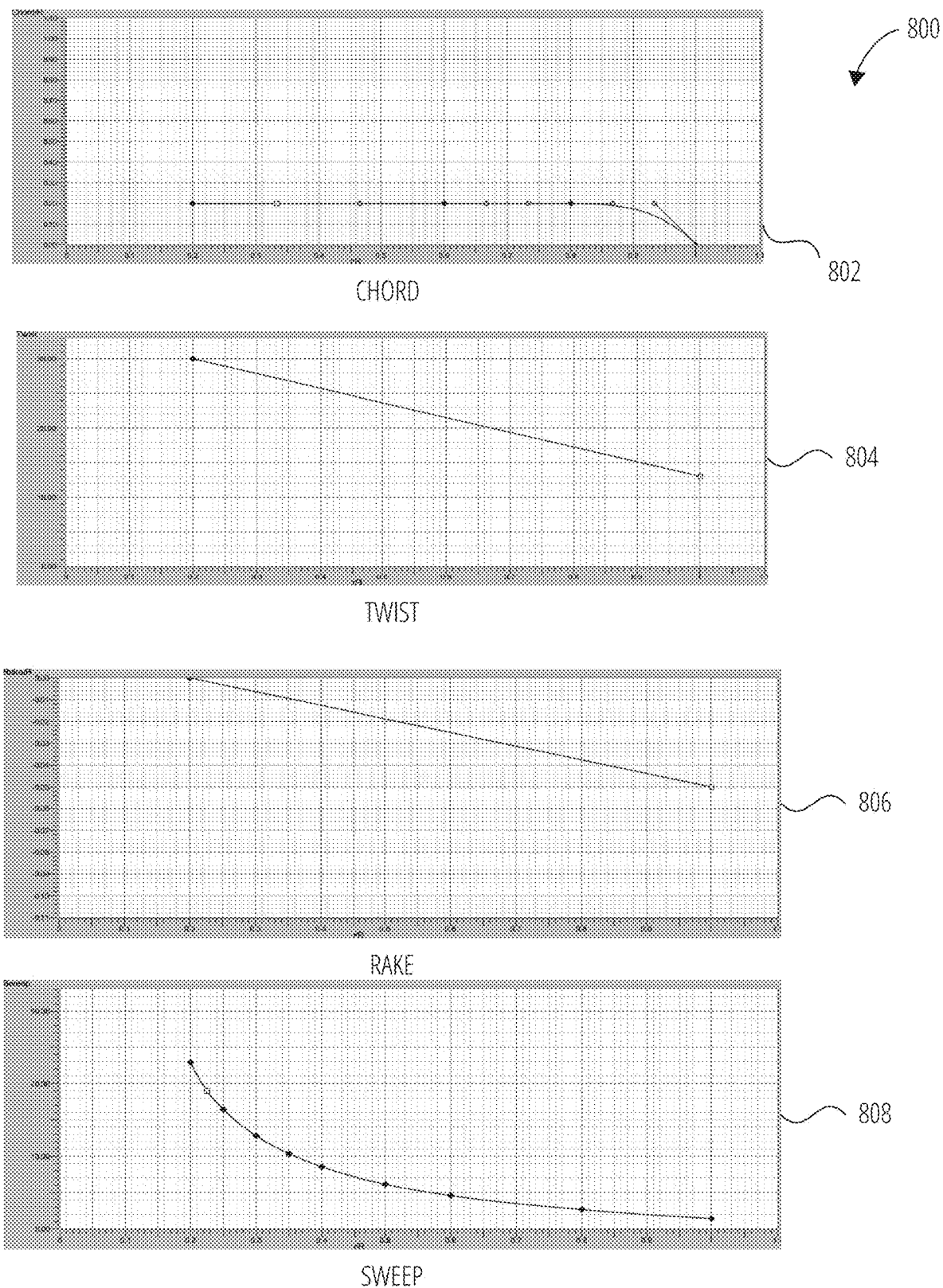
FIG. 8 illustrates parameter diagrams 800 in accordance with some examples.

FIG. 8 includes a number of parameter diagrams 800 showing the variables including chord 802, twist 804, rake 806 and sweep 808, which may be modifiable to modify the shape or profile of a propeller blade to correspond substantially to the profile of a casing of a boom, without significantly impacting the aerodynamic performance of the relevant propeller blade. Specifically, the chord 802 and twist 804 showing shaping curves common to both blade designs (the baseline and conformal) that determine the performance of the blade according to the 'blade element method' (BEM). The rake 806 and the sweep 808 reflect non-zero shaping curves for the conformal blades 402 and 404. A small amount of linear rake and then substantial non-linear sweep applied to these blades enable a low-drag stowed configuration.

Figure 9:
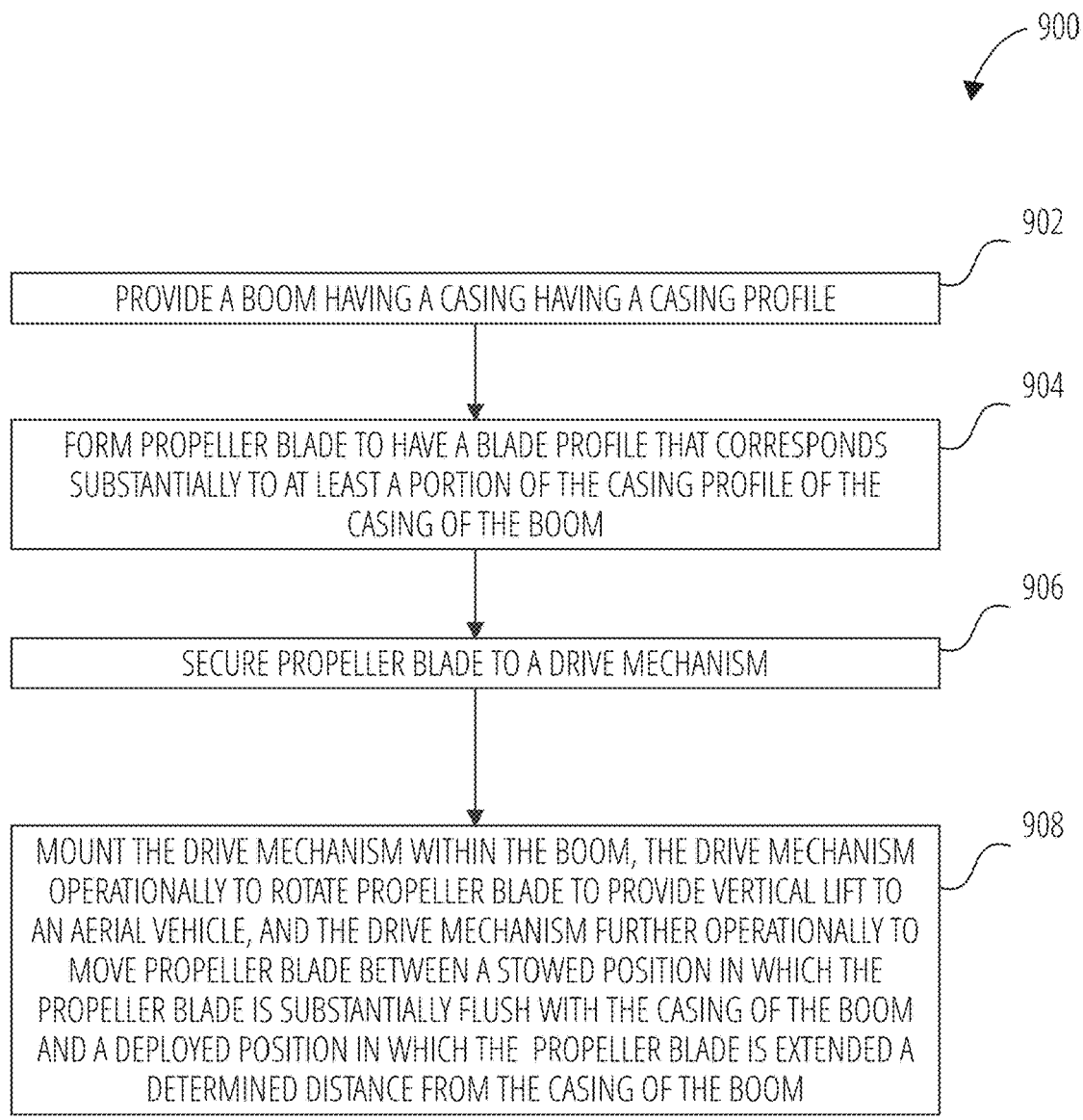
FIG. 9 illustrates a method 900 in accordance with some examples.

FIG. 9 is a flowchart illustrating a method 900, according to some examples, to manufacture a conformal propeller rotor (prop-rotor) assembly, such as a specific example of a boom assembly described above with reference to FIG. 1-FIG. 8.

The method 900 commences at block 902 with the provision of a boom 402 having a casing with a specific profile (e.g., the circular or cylindrical profile shown in FIG. 4).

At block 904, a propeller blade or a set of propeller blades (e.g., blade 404 and blade 406) are formed to have respective blade profiles that correspond substantially to at least a portion of the casing profile of the casing of the boom. This forming of a blade may include modifying a limited set of blade design parameters, such as rake, skew or sweep, in order to modify the blade profile to correspond substantially to the casing profile.

At block 906, the set of propeller blades are attached to a drive mechanism and, at block 908, the drive mechanism (e.g., telescoping driveshaft 110 and electric motor 108) is mounted within the boom 402. The drive mechanism operationally rotates the set of propeller blades to provide vertical lift to an aerial vehicle (e.g., aerial vehicle 1000 of FIG. 10, aerial vehicle 1800 of FIG. 18 or aerial vehicle 2000 of FIG. 20). The drive mechanism further operationally moves the set of propeller blades between a stowed position, in which each of the propeller blades of the set is substantially flush with the casing of the boom, and a deployed position in which each of the propeller blades of the set is extended a determined distance (e.g., at least equal to the quarter length of the blades) from a surface (e.g., an upper or lower surface) of the casing.

The method 900 may also include forming recesses (e.g., recess 408 or recess 410), corresponding to each of the propeller blades of the set, within the casing of the boom. Each of these recesses has a shape and depth to snuggly accommodate a corresponding propeller blade in the stowed position so that an outer surface of the respective blade is substantially flush with an outer surface of the casing of the boom.

Figure 10:
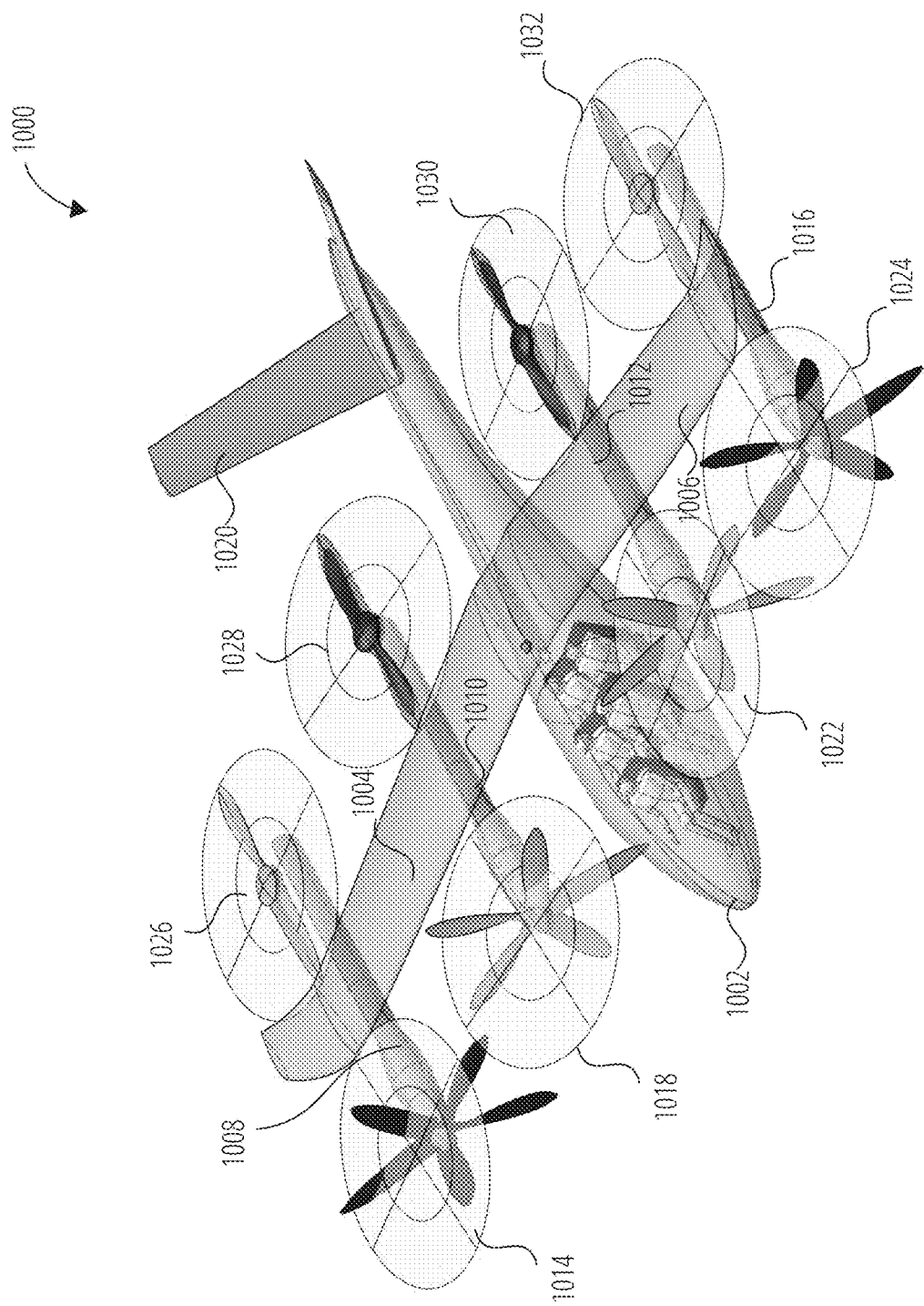
FIG. 10 illustrates an aerial vehicle 1000, in accordance with some examples.

FIG. 10 is a perspective view of an aerial vehicle 1000, according to some examples, which includes a fuselage 1002, the fuselage 1002 having a cabin to accommodate people (e.g., four passengers and a pilot).

The cabin may include one or more seats for passengers. In one embodiment, the cabin includes seating for up to four passengers. Seating may be arranged in two parallel rows of two seats such that one row of passengers face the tail of the aerial vehicle 1000 while the other row of passengers faces the nose (e.g., a forward region of the fuselage 1002) of the aerial vehicle 1000. In one embodiment, the passenger seating can be tiered such that one row of seats is elevated above the other row of seats to maximize space and provide a place for passengers to rest their feet. Alternatively, the seating may be arranged in a single row with two sets of two seats, each of the seats in the set facing opposite directions such that the passengers in the first and third seats face the tail of the aerial vehicle 1000 while passengers in the second and fourth seats face the nose of the aerial vehicle 1000. In other configurations, all four seats face the nose or tail of the aerial vehicle 1000. The arrangement of passenger seats may have alternate configurations in order to distribute the passenger weight in a specific manner such that the aerial vehicle 1000 is balanced during a mode of operation. In other embodiments, the aerial vehicle 1000 can include a larger or smaller number of seats.

The fuselage 1002 also includes a payload bay for operatively receiving and holding a payload (e.g., cargo and luggage), and a battery compartment for removable accommodating battery packs of a battery system. The battery compartment is located below the cabin tin the fuselage 1002. The battery pack is separated from the bottom surface of the fuselage 1002 to facilitate ventilation of the battery pack. The bottom surface of the fuselage 1002 can also include a battery door to allow for the removal of the battery pack. In alternative embodiments, the batteries can be placed above the fuselage 1002 and integral to the wing. The fuselage 1002 can include a charging port on the nose where the aerial vehicle 1000 may be attached to a charging station to restore electrical power stored in the batteries that power the aerial vehicle 1000. Fixed or retractable landing gear may also be attached to the bottom of the fuselage 1002 to facilitate the landing of the aerial vehicle 1000 and allow the aerial vehicle 1000 to move short distances on the ground. Alternatively, the aerial vehicle 1000 may have landing skis protruding from the bottom of the fuselage 1002 and include attachment points for wheels.

The fuselage 1002 also includes an avionics bay (e.g., such as the avionics bay 2302 of FIG. 23) that houses the various systems and subsystems described with reference to FIG. 23).

The aerial vehicle 1000 also includes a pair of wings, namely a starboard wing 1004 and a port wing 1006. A first set of booms, including an outer starboard wing boom 1008 and an inner starboard wing boom 1010, are mounted on the starboard wing 1004. Similarly, a second set of booms, including an inner port wing boom 1012 and an outer port wing boom 1016, are mounted to an undersurface of the port wing 1006. Anyone of the outer starboard wing boom 1008, the inner starboard wing boom 1010, the inner port wing boom 1012, and the outer port wing boom 1016 may be constructed as a boom assembly 400 discussed above with reference to FIG. 4. For example, the fixed rotor 1026, the fixed rotor 1028, the fixed rotor 1030 and/or the fixed rotor 1032 may have blades and drive mechanisms constructed as describe with reference to FIG. 4.

A first set of tilt rotors, in the form of the tilt rotors 2308, are respectively mounted at or adjacent forward ends of the outer starboard wing boom 1008, inner starboard wing boom 1010, inner port wing boom 1012, and outer port wing boom 1016. Further, a second set of fixed rotors, in the form of the fixed rotors 2310, are respectively mounted at or adjacent aft ends of the outer starboard wing boom 1008, inner starboard wing boom 1010, inner port wing boom 1012, and outer port wing boom 1016.

Each of the tilt rotors 2308, namely tilt rotor 1014, tilt rotor 1018, tilt rotor 1022 and tilt rotor tilt rotor 1024 are operationally tiltable, under control of the tilt control system 2306, between a first vertical position in which the tilt rotors 2308 provide vertical lift to the aerial vehicle 1000 and a second horizontal position in which the tilt rotors 2308 provide forward thrust and propulsion to the aerial vehicle 1000. The tilting of the tilt rotors 2308 also adjusts flow attachment across the starboard wing 1004 and port wing 1006.

A tail 1020 is shown to be secured to the aft end of the fuselage 1002. In one embodiment, the tail 1020 s a V-shaped detail, as shown in FIG. 10

The aerial vehicle 1000 uses tilting rotors (e.g., tilt rotors 2308) forward of the wings (e.g., starboard wing 1004 and port wing 1006) to enable higher speeds and reduce lift-drag coefficients. Blowing of the wing by these tilt rotors 2308 assists flow attachment across the transition envelope of the wings and improves realizable lift coefficient (Cl). The fixed rotors 2310 aid wing trailing edge flow circulation.

Figure 11:
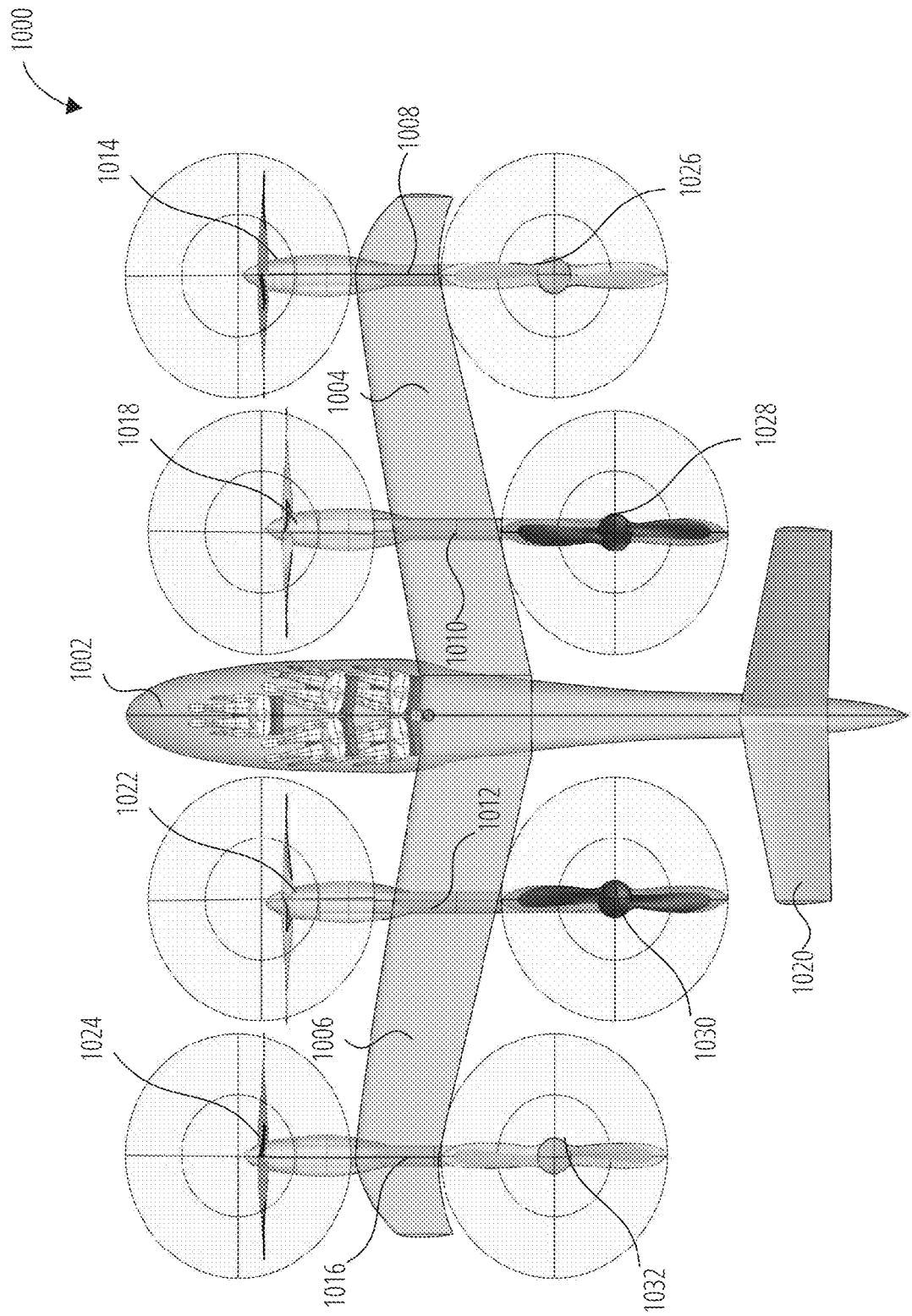
FIG. 11 illustrates an aerial vehicle 1000, in accordance with some examples.

FIG. 11 is a top view of the aerial vehicle 1000, according to the example embodiment, in a cruise mode, in which the rotational axis of each of the tilt rotors 2308 is horizontally aligned (so that the blades are vertically aligned) to provide forward propulsion for the aerial vehicle 1000, while the fixed rotors 2310 remain fixed with the rotational axes of the fixed rotors 2310 vertically aligned to provide lift as necessary. Operationally, the fixed rotors 2310 may each be locked, with the respective blades oriented, as shown in FIG. 10, so that only the tilt rotors 2308 are operated to provide forward propulsion for the aerial vehicle 1000. In a further operational mode, only selected ones of the fixed rotors 2310 may be operational so as to provide flight stability for the aerial vehicle 1000. For example, in FIG. 10, the fixed rotor 1026 and the fixed rotor 1032 may operationally rotate so as to provide stability, while the fixed rotor 1028 and the fixed rotor 1030 may be locked during a particular phase or stage of a cruise mode.

Figure 12:
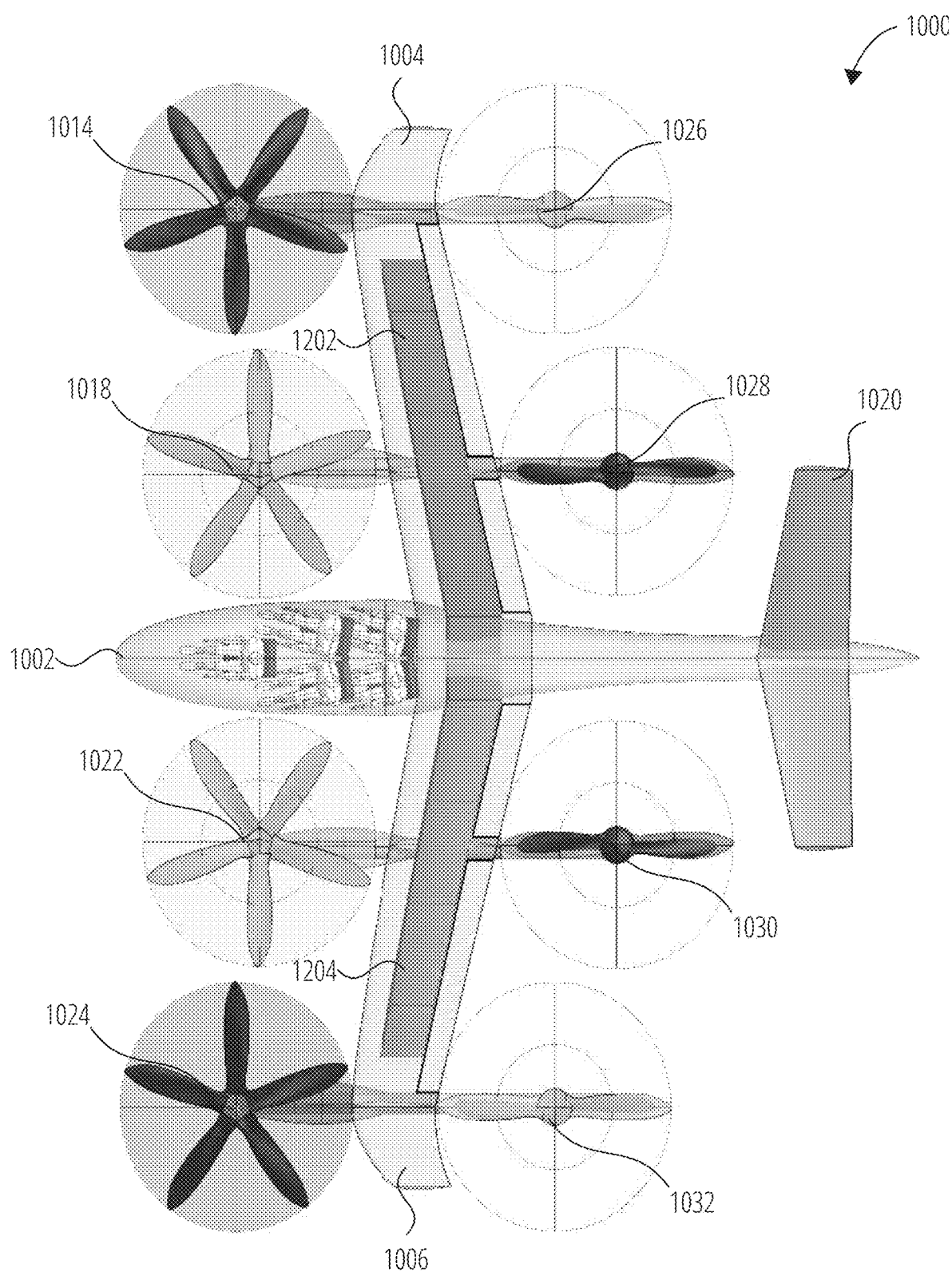
FIG. 12 illustrates an aerial vehicle 1000, in accordance with some examples.

FIG. 12 is a perspective view of the aerial vehicle 1000, according to some examples, further showing the location of a battery system, including battery unit 1202 and battery unit 1204 that are housed within each of the starboard wing 1004 and port wing 1006 of the aerial vehicle 1000. The battery system, in one embodiment, is composed of a number of discrete battery units which are electrically coupled and extend substantially along the length of each of the wings of the aerial vehicle 1000. The battery system is furthermore electrically coupled so as to provide electric power to electric motors of each of the rotors of the aerial vehicle 1000.

Figure 13:
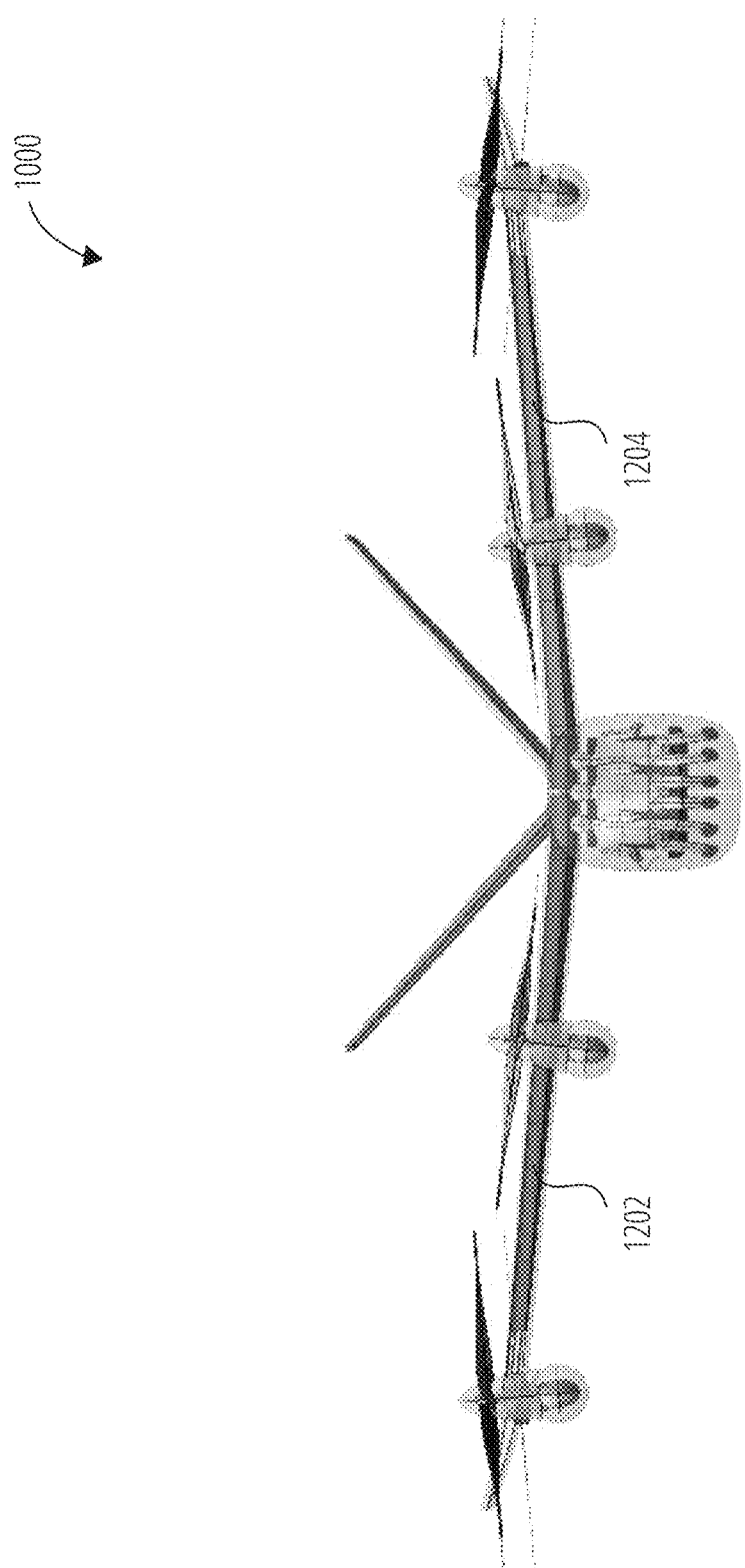
FIG. 13 illustrates an aerial vehicle 1000, in accordance with some examples.

FIG. 13 is a front view of the aerial vehicle 1000, according to some examples and provides a view of the aerial vehicle 1000 in a lift/descend/hover mode. In this mode, the rotational axes of the tilt rotors 2308 are vertically aligned, so as to provide horizontal thrust and lift for the aerial vehicle 1000. FIG. 13 also shows the location of the battery unit 1202 in the starboard wing 1004, and the battery unit 1204 within the port wing 1006 of the aerial vehicle 1000.

Figure 14:
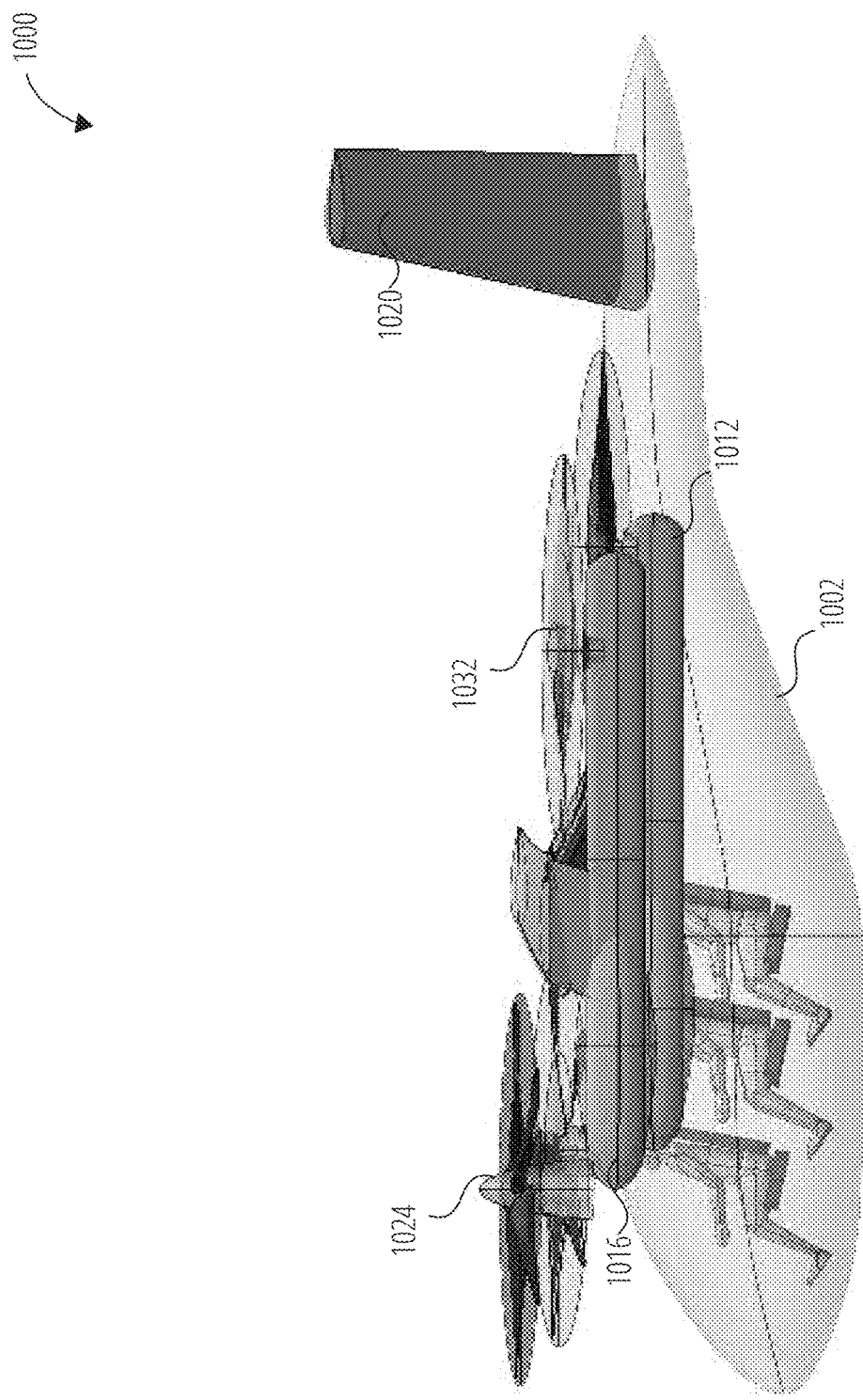
FIG. 14 illustrates an aerial vehicle 1000, in accordance with some examples.

FIG. 14 is a side view of the aerial vehicle 1000, according to some examples, again illustrating the aerial vehicle 1000 in a lift/descend/hover mode, with the fixed rotor 1030 and fixed rotor 1032 shown to be mounted to the outer port wing boom 1016.

Figure 15:
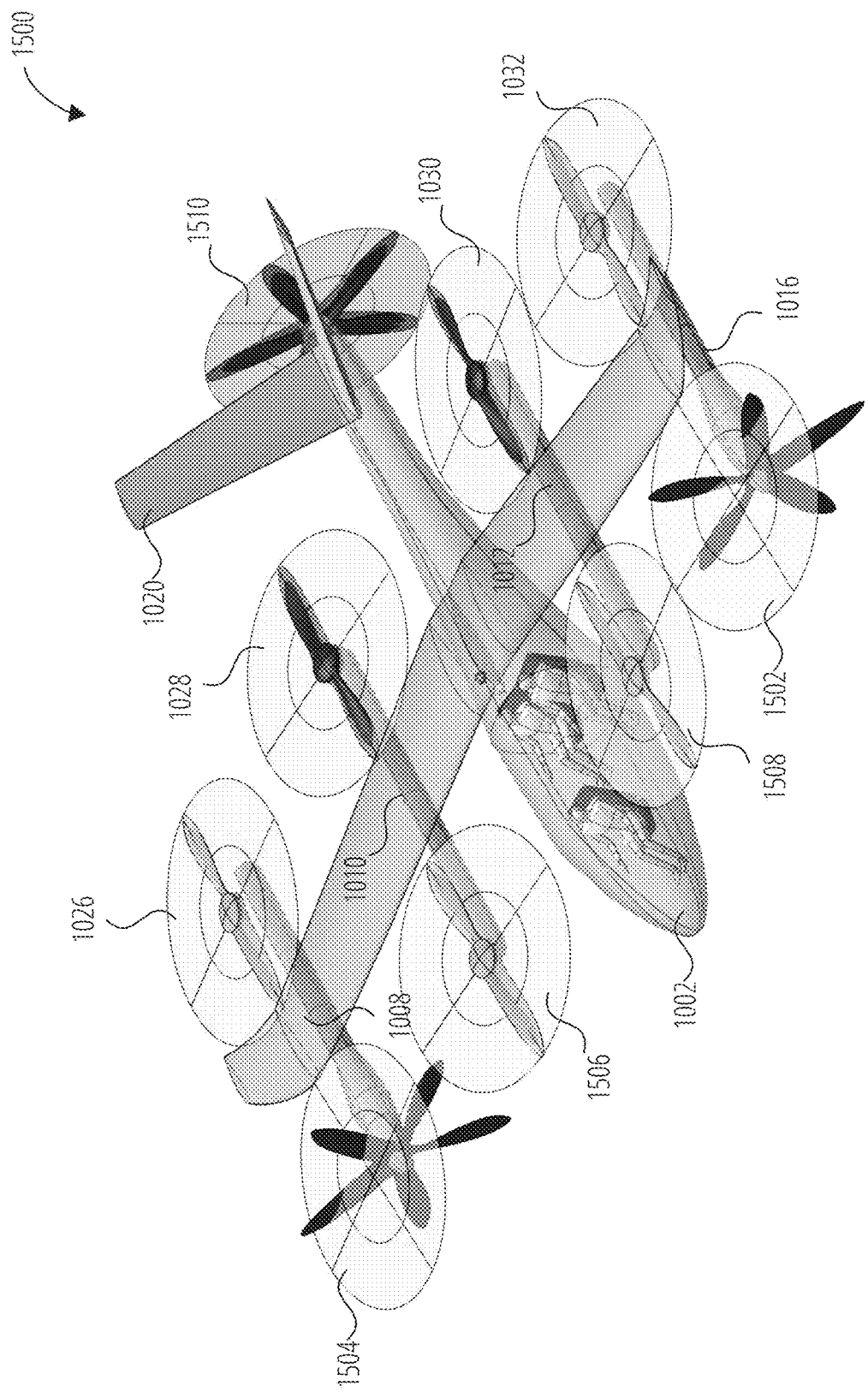
FIG. 15 illustrates an aerial vehicle 1500, in accordance with some examples.

FIG. 15 is a perspective view of an aerial vehicle 1500, according to further examples, in which the forward rotors include:
one pair of tilt rotors, namely boom 1504 and outer port tilt rotor 1502, mounted at or adjacent to the forward ends of the outer starboard wing boom 1008 and the outer port wing boom 1016 respectively, and
another a pair of fixed rotors, namely an inner starboard fixed rotor 1506 and an inner port fixed rotor 1508, mounted at or adjacent to the forward ends of the inner starboard wing boom 1010 and inner port wing boom 1012 respectively.

The aerial vehicle 1500 also includes a rear fixed rotor 1510, mounted at the aft end of the fuselage 1002 and behind the tail 1020.

FIG. 15 illustrates the aerial vehicle 1500 in a cruise mode, in which the boom 1504 and outer port tilt rotor 1502 are oriented with the rotational axes horizontally aligned so as to provide forward thrust. Further, the rotors whose blades are indicated in a dark shading (i.e., boom 1504, outer port tilt rotor 1502, fixed rotor 1028, fixed rotor 1030, and rear fixed rotor 1510) are engaged and rotating during the illustrated cruise mode, while the remaining rotors (e.g., inner starboard fixed rotor 1506, inner port fixed rotor 1508, fixed rotor 1026 and fixed rotor 1032) are locked.

Figure 16:
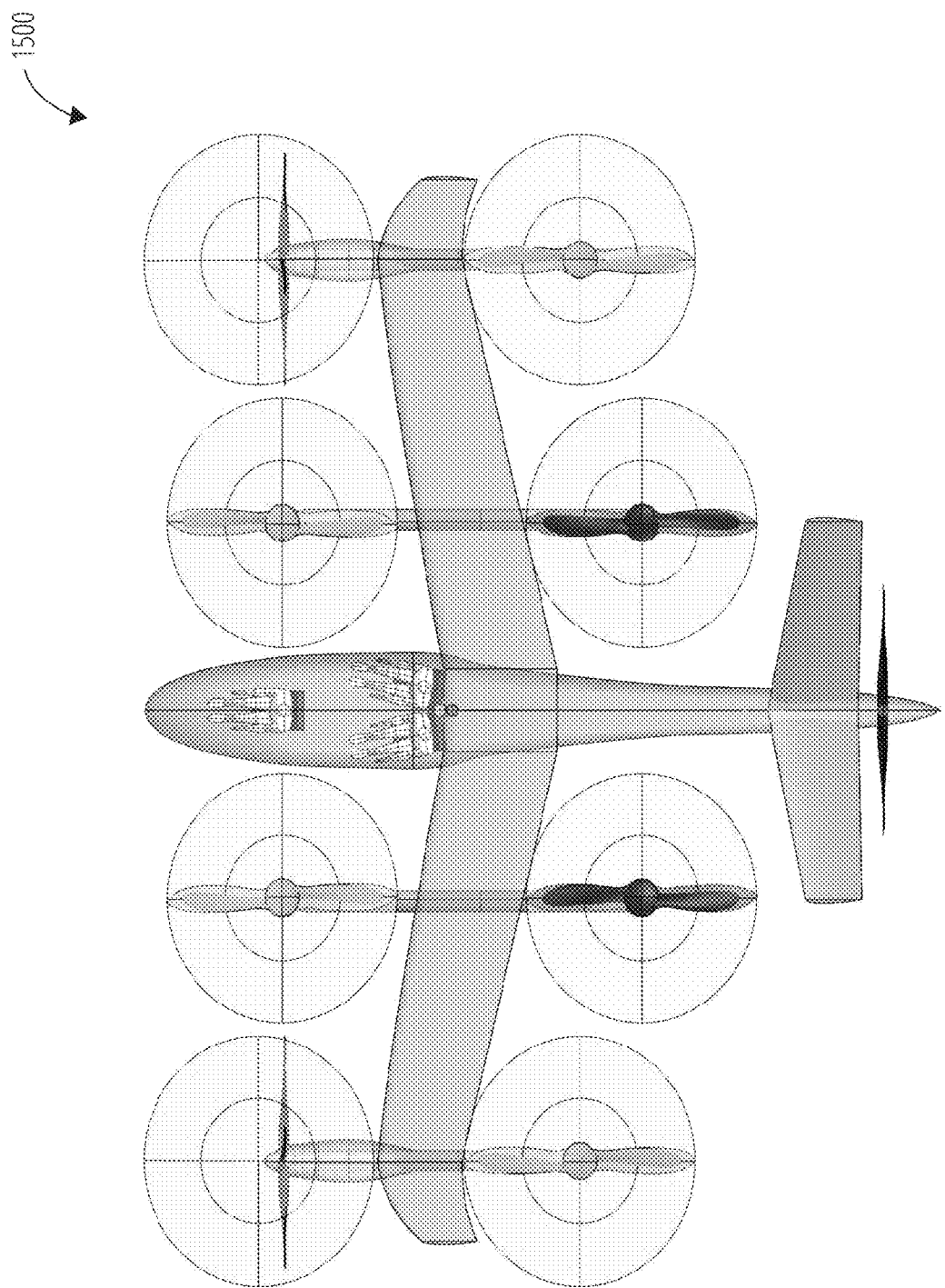
FIG. 16 illustrates an aerial vehicle 1500, in accordance with some examples.

FIG. 16 is a top view of the aerial vehicle 1500, according to some examples, again showing the aerial vehicle 1500 in a cruise mode in which two tilt rotors forward of the wings are engaged and two fixed rotors, aft of the wings, are similarly engaged, while the remaining rotors are locked in the cruise mode.

Figure 17:
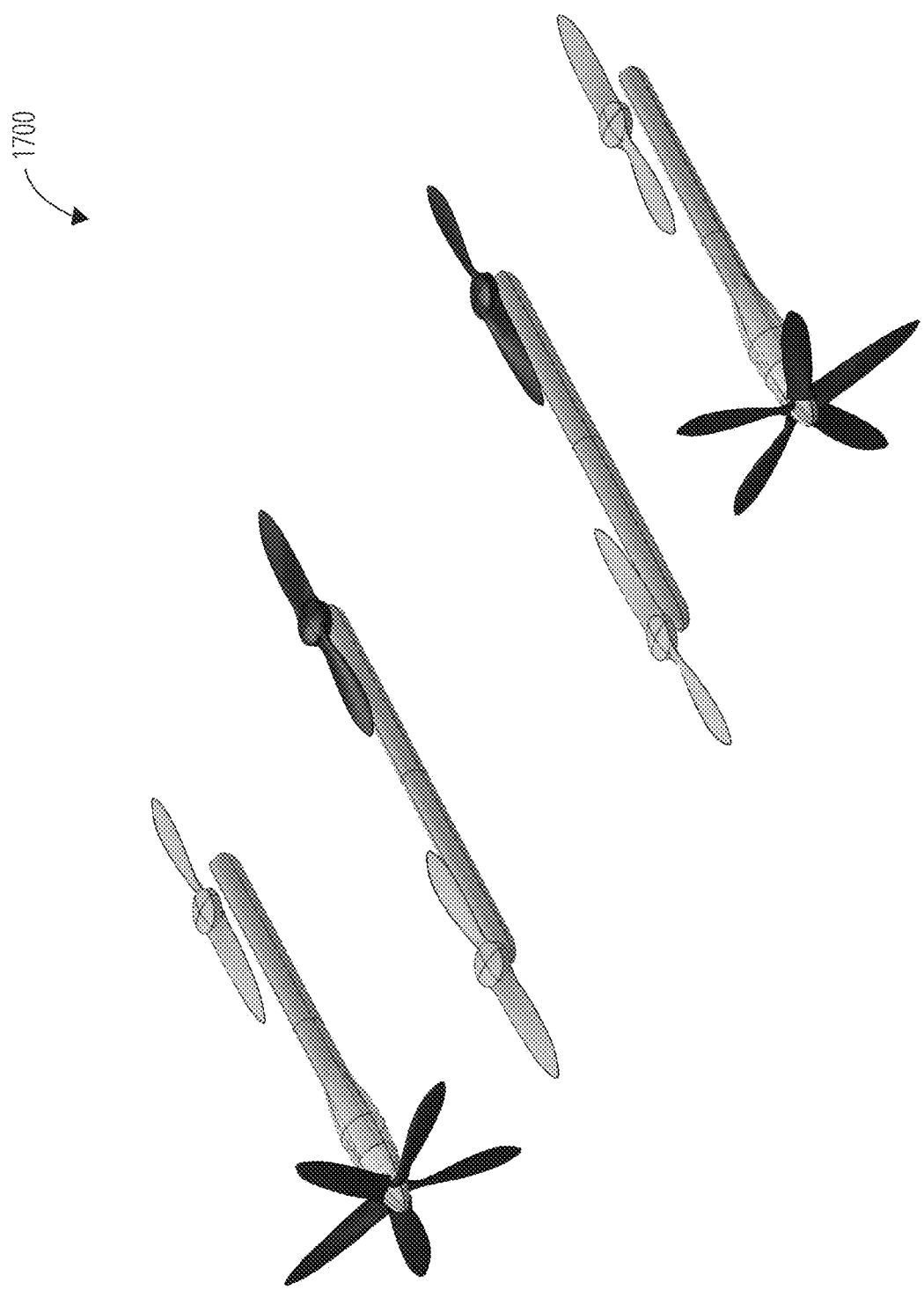
FIG. 17 illustrates boom assemblies 1700, in accordance with some examples.

FIG. 17 is a diagram showing further details of the boom assemblies 1700 that may be mounted to the wings of the aerial vehicle 1500, according to some examples, with the dark shaded rotors being operational during a cruise mode, while the light shaded rotors are fixed in this particular mode. Any one of these boom assemblies 1700 may be constructed as described with reference to FIG. 1-FIG. 8.

Figure 18:
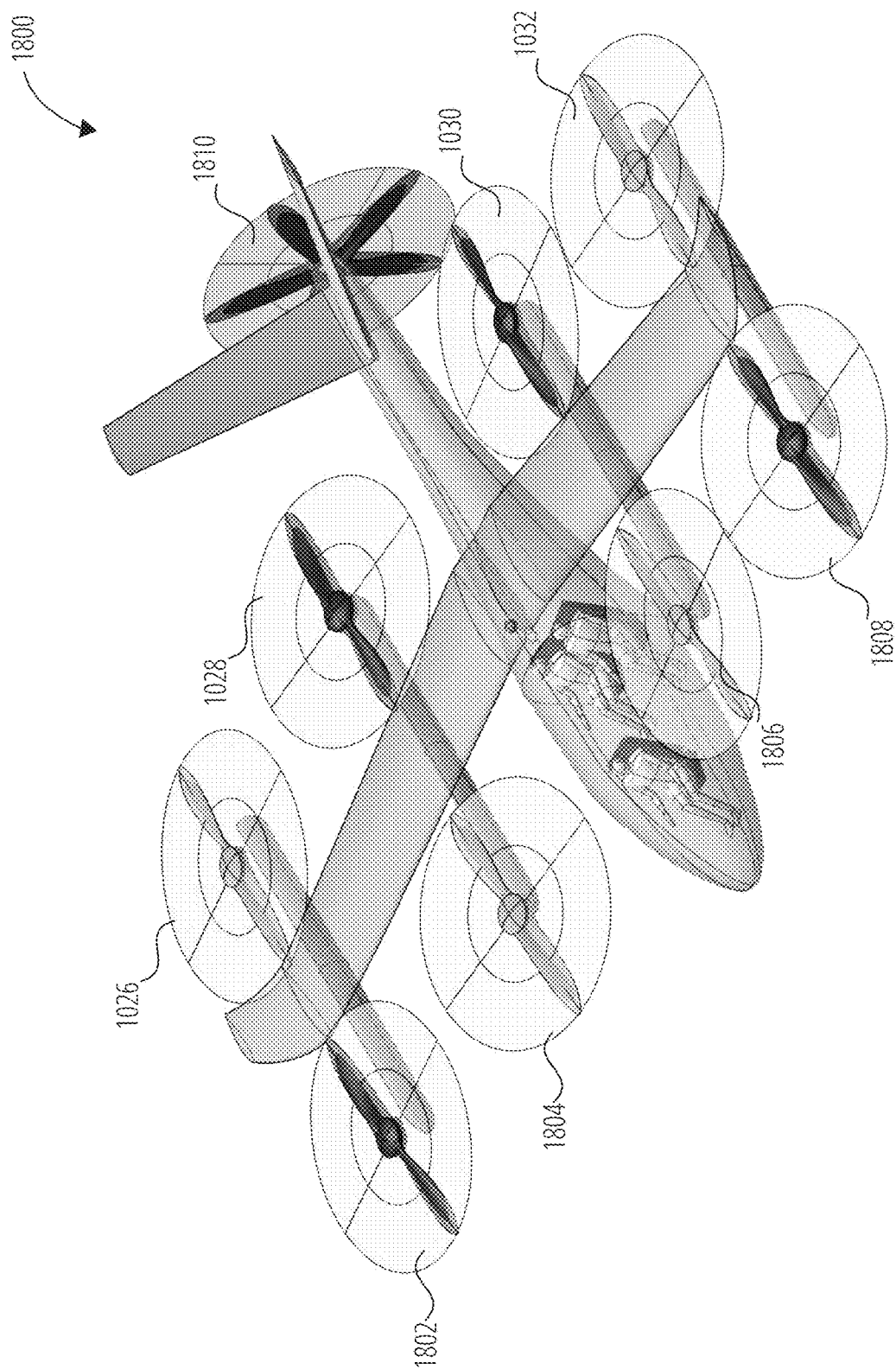
FIG. 18 illustrates an aerial vehicle 1800, in accordance with some examples.

FIG. 18 is a perspective view of an aerial vehicle 1800, according to yet further examples, in which each of the forward rotors, namely outer starboard fixed rotor 1802, inner starboard fixed rotor 1804, inner port fixed rotor 1806, and outer port fixed rotor 1808, are fixed rotors, as are each of the fixed rotors, namely fixed rotor 1026, fixed rotor 1028, fixed rotor 1030 and fixed rotor 1032. The aerial vehicle 1800 also includes a rear fixed rotor 1810. FIG. 18 illustrates the aerial vehicle 1800 in a cruise mode, in which the rear fixed rotor 1810 is providing forward thrust, while a subset of the fixed rotors (e.g., outer starboard fixed rotor 1802, fixed rotor 1028, fixed rotor 1030 and outer port fixed rotor 1808) operationally provide some vertical thrust or propulsion so as to provide stability during flight to the aerial vehicle 1800. Specifically, the rotors of the aerial vehicle 1800 may be canted in various ways to provide robust control of the aerial vehicle 1800 in various states.

Figure 19:
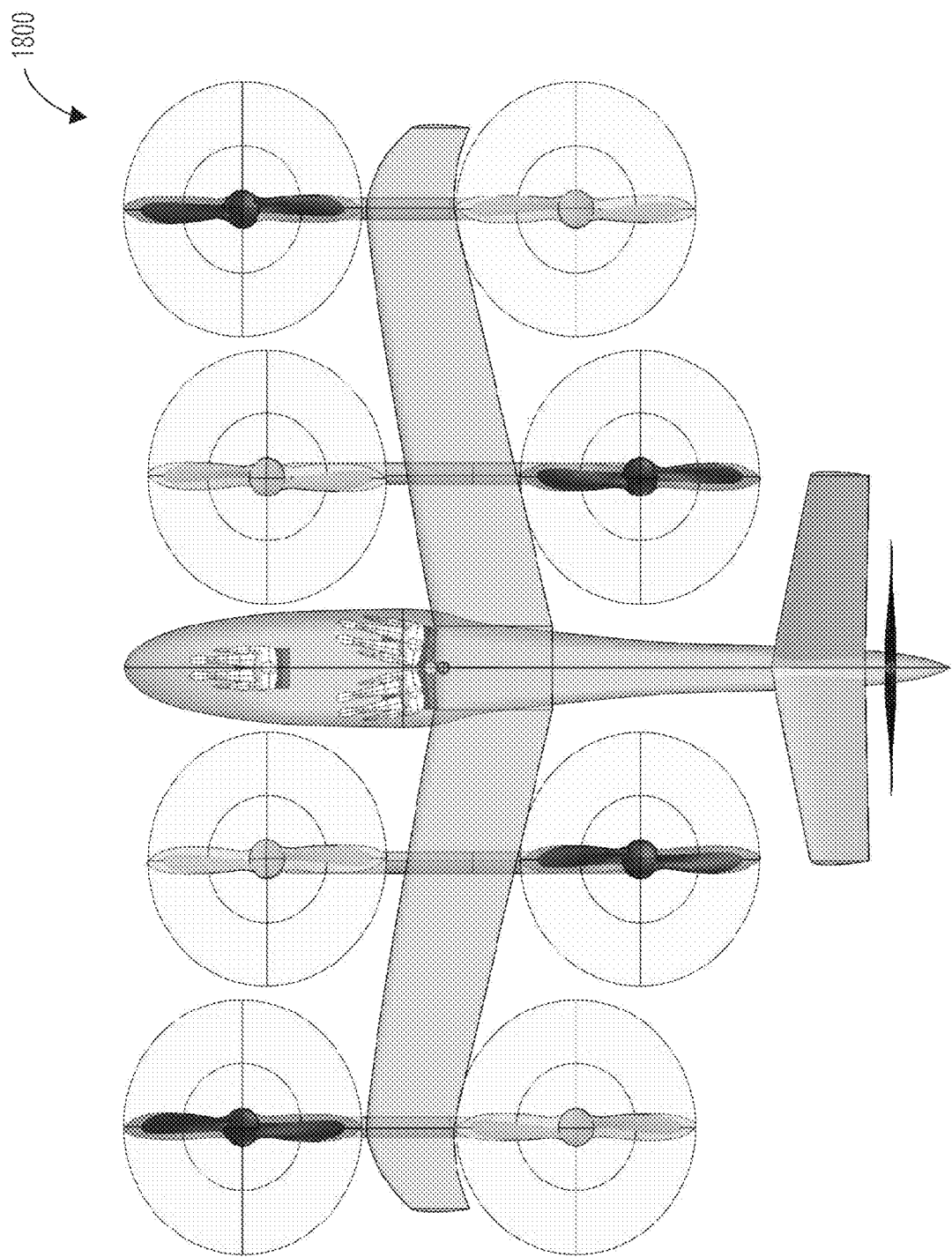
FIG. 19 illustrates an aerial vehicle 1800, in accordance with some examples.

FIG. 19 is a top view of the aerial vehicle 1800, according to the example embodiment, again illustrating in dark shading the fixed rotors that may be operational during a cruise mode of the aerial vehicle 1800. In a hover (or takeoff/landing) mode, all of the fixed rotors attached to the booms may be engaged to provide needed vertical thrust and lift, while the rear fixed rotor 1810 may be used to provide additional horizontal propulsion.

Figure 20:
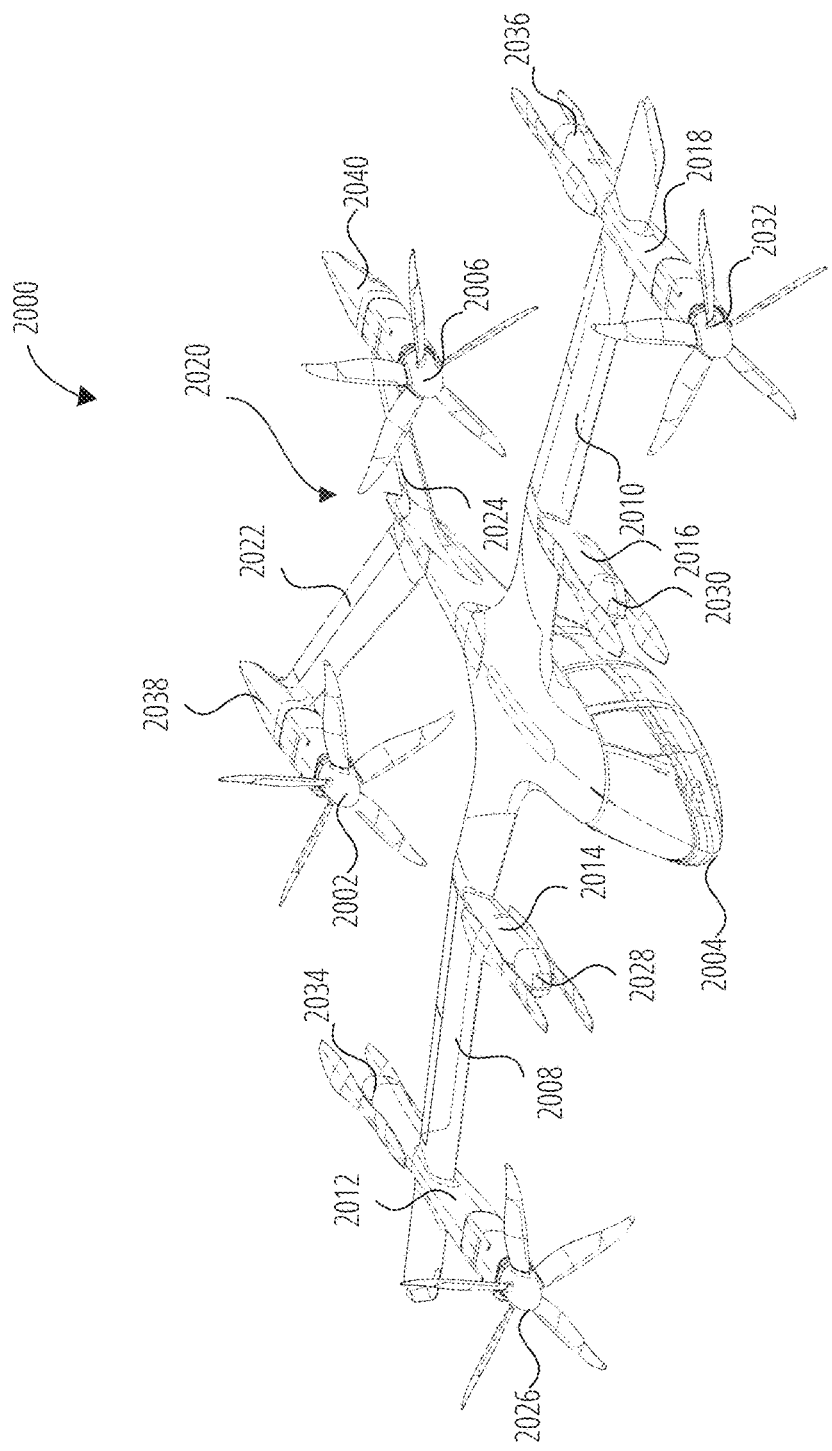
FIG. 20 illustrates an aerial vehicle 2000, in accordance with some examples.

FIG. 20 is a front perspective view of an aerial vehicle 2000, according to some examples, in a cruise mode. FIG. 18 provides a front perspective view of the aerial vehicle 2000 in a takeoff and landing (or hover) mode. The aerial vehicle 2000 includes a fuselage 2004 having an interior that cabin (e.g., with capacity for four passengers and a pilot), and a payload bay to operatively receive and hold a payload (e.g., cargo, luggage, etc.). As with the aerial vehicle 2000, the fuselage 2004 may also include a battery bay or compartment to accommodate battery packs for an electrical control system of the aerial vehicle 2000. The fuselage 2004 also provides an avionics bay (e.g., such as the avionics bay 2302 of FIG. 23) that houses various avionics systems and subsystems.

The aerial vehicle 2000 has two pairs of wings, namely main wings and the tail wings, designated generally as a V-tail 2020. The main wings include a starboard wing 2008, and a port wing 2010. A first set of booms are attached to the main wing, namely a starboard outer wing boom 2012, a starboard mid-wing boom 2014, a port mid-wing boom 2016, and a port outer wing boom 2018. Any one of these booms may be at least partially constructed The V-tail 2020 as a starboard tail section 2022, a port tail section 2024, with a starboard tail boom 2038 being attached at or towards a free end of the starboard tail section 2022, and a port tail boom 2040 being attached at or adjacent a free end of the port tail section 2024.

The aerial vehicle 2000 uses a combination of tilt rotors and non-titling (or fixed) stacked rotors. The tilt rotors operationally pivot between a cruise mode position, in which their rotational axes are horizontally aligned, and they provide forward (tractor) propulsion, and a hover mode position, in which their rotational axes are vertically aligned and they provide lift.

Turning to the tilt rotors, a first pair of tilt rotors, namely tilt rotor 2026 and tilt rotor 2032, are mounted at or adjacent to the forward ends of the starboard outer wing boom 2012 and port outer wing boom 2018 respectively. A second pair of tilt rotors, namely tilt rotor 2002 and tilt rotor 2006, are mounted at or adjacent to the forward ends of the starboard tail boom 2038 and port tail boom 2040, respectively.

Turning to the stacked rotors, FIG. 20 also shows that a set of stacked rotors are also mounted at or adjacent free ends of a number of the main wing booms. The stacked rotors may be constructed with conformal blades and drive mechanisms as described above with reference to FIG. 4-FIG. 8.

A stacked rotor 2034 is mounted at the trailing edge of the starboard outer wing boom 2012, a stacked rotor 2028 is mounted at a forward end of the starboard mid-wing boom 2014, a stacked rotor 2030 is mounted at a forward (or leading) end of the port mid-wing boom 2016, and a stacked rotor 2036 is mounted at or adjacent a trailing end of the port outer wing boom 2018. Each of the tilt rotors is operationally tiltable, under control of a tilt control system 2306, between a first vertical position in which the tilt rotor provides vertical lift to the aerial vehicle 2000, and a second horizontal position in which the tilt rotor provides forward thrust for propulsion. The tilting of the tilt rotors also adjusts airflow attachment across the starboard wing 2008 and the port wing 2010, as well as across the starboard tail section 2022 and port tail section 2024.

The aerial vehicle 2000 uses the tilt rotors forward of the wings to enable higher speeds and to reduce lift-drag coefficients across these wings. Blowing of a wing by the tilt rotors also assists flow attachment across a transition envelope of the wings and improves realizable lift coefficient (Cl). The pair of stacked rotors (e.g., stacked rotor 2034 and stacked rotor 2036) are paired with the tilt rotor 2026 and tilt rotor 2032 respectively and are located behind a wing trailing aid flow circulation.

The example aerial vehicle 2000 differs from the example aerial vehicle 1000 in a number of ways. First, the example aerial vehicle 2000 uses stacked dual-propeller rotors (e.g., stacked rotor 2034, stacked rotor 2028, stacked rotor 2030, and stacked rotor 2036), as opposed to single-propeller fixed rotors (e.g., fixed rotor 1026, fixed rotor 1028, fixed rotor 1030 and fixed rotor 1032) of the aerial vehicle 1000. In the aerial vehicle 2000, the stacked rotor 2034 and stacked rotor 2036 are located behind the main wing in order to provide lift and stability to the aerial vehicle 2000. Locating a stacked rotor behind a wing allows for improved circulation over the wing and the stacked rotor. More specifically, by using stacked rotors (e.g., stacked rotor 2034 and stacked rotor 2036) behind the primary tractor rotors (e.g., tilt rotor 2026 and tilt rotor 2032) on the outer booms (e.g., starboard outer wing boom 2012 and port outer wing boom 2018), the aft set of stacked rotors operationally direct air downwards from the trailing edge of the wings (e.g., port wing 2010 and starboard wing 2008). This serves to increase the airflow attachment to the outermost portions of the wings which is particularly beneficial during transitions between hover and cruise modes. Consider where, for example, during a transition from a hover to cruise mode, that the tilt rotor 2026 may be tilted at an angle and have a height differential with respect to the starboard wing 2008. While the airflow during this transition may otherwise be susceptible to detachment from starboard wing 2008, the downward airflow generated by the stacked rotor 2034 may counter such airflow detachment.

As a result, a stacked rotor may provide advantages to the lift during vertical takeoff and landing. The location of the stacked rotors behind wing also allows for alignment of an aerodynamic center, a center of thrust, and a center of gravity of the aircraft during different modes of operation.

On the other hand, the stacked rotor 2028 and stacked rotor 2030 are located at or adjacent to the forward ends of starboard mid-wing boom 2014 and port mid-wing boom 2016 respectively and provide lift contribution during the vertical takeoff and landing, as well as hovering.

The alternating arrangements on the stacked rotors on either side of a respective main wings reduces interference from propeller flows during transition, and reduces power required to transition from a vertical mode to a cruise mode. Further, the position of the various rotors may serve to reduce turbulent wake flow (e.g., turbulence introduced by a propeller) ingestion between rotors. The rotors are located so that the impact of airflow from one rotor does not negatively interfere with airflow from another rotor (or propeller). The arrangement of the rotors of the aerial vehicle 2000 may also provide efficiencies with respect to lift, and downwash airflow distribution during transition configurations, so as to achieve lower induced drag, power and noise.

The rotor configuration set up of the aerial vehicle 2000 shown in FIG. 20 may also provide further benefits and advantages. By mounting the tilt rotor 2006 and tilt rotor 2002 on wingtip booms (e.g., starboard tail boom 2038 and port tail boom 2040) of the V-tail 2020, the aerial vehicle 2000 is no longer constrained by having pairs of inner rotors (e.g., stacked rotor 2030 and tilt rotor 2006) inline at a mid-wing location. This decoupling of the inner rotors enables the tail of the aerial vehicle 2000 to be extended, and also provide some benefits with respect to downwash from the wings in a hover state or even a transition state. Specifically, there is less tractor propulsor (e.g., tilt rotor 2006) washdown An even further advantage provided by the example rotor configuration is that of redundancy. In one example, the blades from the fixed stacked rotors are uniform across these rotors, as are the blades of the tilt rotors across these rotors. In addition, a common tilting mechanism (to be described further) is common across all of the tilt rotors. This commonality of parts and components ensures that a failure of one rotor (e.g., stacked rotor 2028) can be compensated for by other rotors (e.g., stacked rotor 2034, stacked rotor 2030 and stacked rotor 2036) in a convenient manner.

Figure 21:
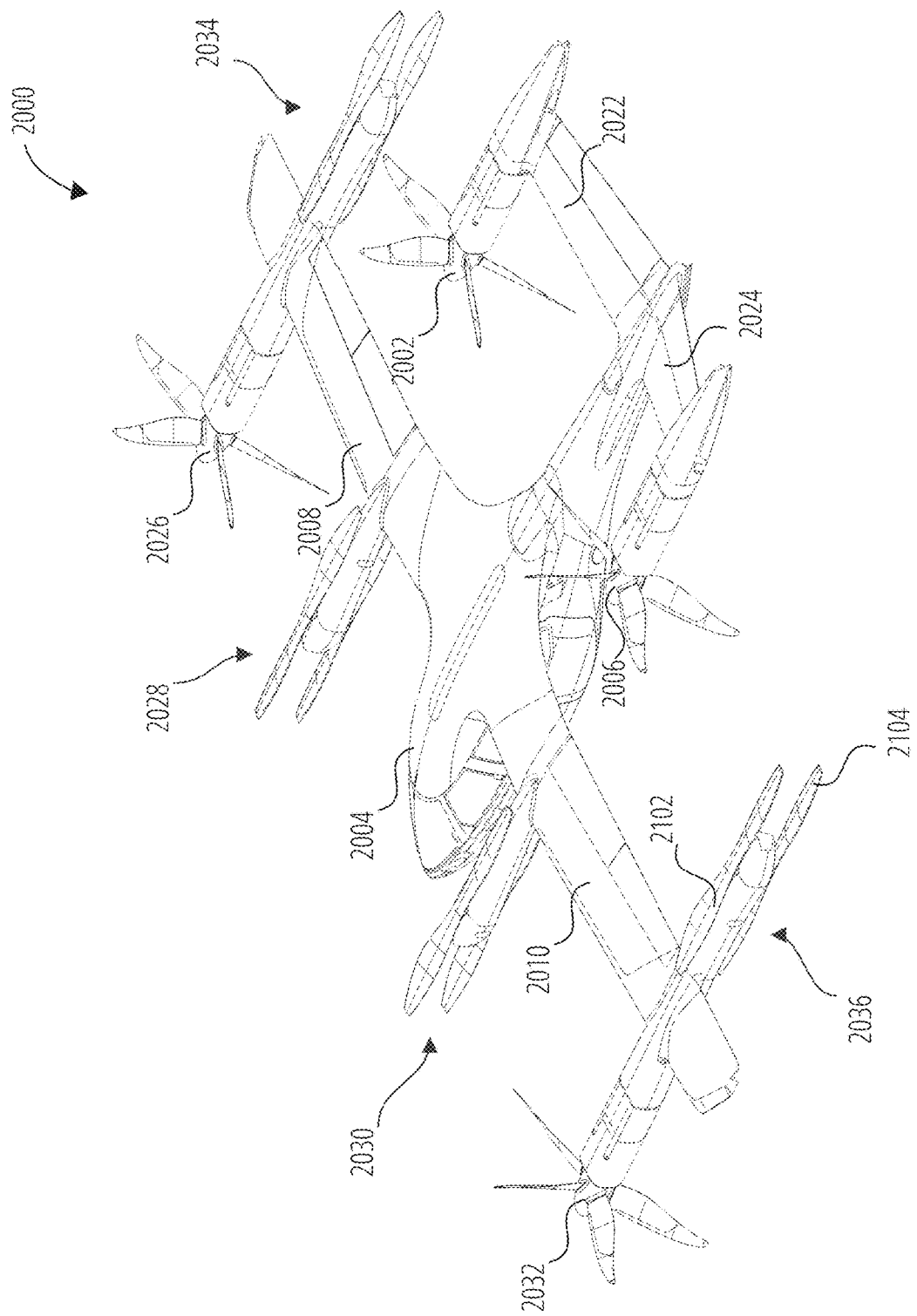
FIG. 21 illustrates an aerial vehicle 2000, in accordance with some examples.

FIG. 21 is a rear perspective view of the aerial vehicle 2000, according to some examples, in cruise mode (cruise mode is also shown in FIG. 20). Further details regarding the stacked rotors will now be discussed with reference to FIG. 21

A stacked rotor functions to provide lift and thrust to an aircraft during takeoff and landing. Each stacked rotor (e.g., stacked rotor 2036) includes a first propeller (e.g., upper propeller 2102) and a second propeller (e.g., lower propeller 2104). The first propeller and the second propeller each include two blades coupled to a blade hub. The blades of the first propeller and the second propeller co-rotate about an axis of rotation. The first propeller and the second propeller can have a variable pitch.

For a particular stacked rotor (e.g., stacked rotor 2036), the first propeller (e.g., upper propeller 2102) can be coupled (e.g., mechanically, electrically) to a first motor and the second propeller (e.g., lower propeller 2104) can be coupled to a second motor to enable independent control of each propeller. The first motor or the second motor can control both the first propeller and the second propeller in some examples. For instance, if the first motor fails (e.g., battery dies), the second motor can control the rotation of the first propeller and the second propeller.

While the stacked rotors are shown in FIG. 21 to have split propellers or have a separated stack (e.g., a boom portion is located between the blades or the blades are located on either vertical sides of a boom), in other examples, both propellers may be located on the same side of the boom to form an integrated stack. However, having a separated stack may provide some advantages with respect to volumetric packaging (e.g. of one or more motors to drive the propellers) within a boom.

Further, while the example stacked rotors shown in FIG. 21 have dual-blade propellers, in other examples, propellers having three, four or even more blades may be used.

A stacked rotor can also include a clutch that allows the first propeller and the second propeller to lock together to ensure an appropriate azimuth angle during a mode of operation. A clutch allows for a stacked rotor to provide thrust from both the first propeller and the second propeller, even in a case where one of the motors (e.g., first motor) fails and the other motor (e.g., second motor) controls the rotation of the first propeller and the second propeller.

In some examples, a stacked rotor can include a single motor and a controller with a clutch used to control the azimuth angle that is used in a mode of operation, and in other examples, a stacked rotor can include two motors with independent controllers and a clutch used in a case when one of the motors fails. The first motor and the second motor can also control the precise azimuth angle of the first propeller relative to the second propeller, when the blades are stationary or in motion. The azimuth angle depends on the mode of operation.

The co-rotating propellers (e.g., first propeller, second propeller) may be synchronized such that they rotate at the same speed to reduce the noise generated by the aerial vehicle 2000. The azimuth angle is constant when the first propeller and second propeller are rotating at the same speed (e.g., during steady flight). The azimuth angle can depend on the shape of the blade and/or the mode of operation.

The speed of the propellers may be adjusted based on the amount of thrust required to provide vertical ascent and descent and the amount of noise allowable in the geographic area in which the aerial vehicle 2000 is traveling. For example, the pilot might lower the speed of the aerial vehicle 2000, causing the aerial vehicle 2000 to climb more slowly, in areas in which a lower level of noise is desirable (e.g., residential areas). In one embodiment, the maximum speed of a free end of each blade is 450 feet per second. This may keep the noise produced by the aerial vehicle 2000 below an acceptable threshold. In other embodiments, other maximum speeds may be acceptable (e.g., depending on the level of noise considered acceptable for the aircraft and/or aircraft environment, depending on the shape and size of the blades, etc.).

A stacked rotor can be encapsulated in a duct. The duct can surround the blades and a rotor mast to augment the flow over the first propeller and/or the second propeller. The duct can function to increase the thrust generated by a stacked rotor and/or adjust the pressure difference above and below the co-rotating propellers.

Co-rotating propellers may provide an advantage over single propellers because they can produce less noise. Noise produced by propellers varies as an exponent of the tip speed of a propeller; thus, in order to reduce noise produced by a single rotor propeller, the aircraft speed is also reduced. A stacked rotor design also allows for flexibility of angles between the propellers, which can be varied during different stages of flight functioning to increase the efficiency of the system. The speed and phase angle can be adjusted for each propeller on a stacked rotor, allowing for a more flexible and adaptable system. The stacked rotors can be stored during modes of operation where they are not necessary in order to reduce drag and improve efficiency.

The configuration of a stacked rotor can vary depending on requirements of the aircraft system and/or operation mode. In one embodiment, each co-rotating propeller has the same blade shape and profile, while in other embodiments, the first propeller and the second propeller have different dimensions and an offset phase of rotation. For example, the first propeller and the second propeller may have different camber and twist such that, when the propellers are azimuthally separated, a stacked rotor is able to achieve optimal camber between the two surfaces. For example, in one embodiment, the diameter of the second propeller is approximately 95% of the diameter of the first propeller.

In relation to material composition, a stacked rotor can be made from of a single material or can be a composite material able to provide suitable physical properties for providing lift to the aircraft. The first propeller and the second propeller can be made from the same material or different materials. For example, the first propeller and the second propeller can be made from aluminum, or the first propeller can be made from steel and the second propeller can be made from titanium. A blade hub can be made from the same or different material than the first propeller and the second propeller. Alternatively, the components of a stacked rotor can be made from a metal, polymer, composite, or any combination of materials. The stacked rotor may also be exposed to extreme environmental conditions, such as wind, rain, hail, and/or extremely high or low temperatures. Thus, the material of the stacked rotor can be compatible with a variety of external conditions.

In relation to mechanical properties, the material of the first propeller and the second propeller can have a compressive strength, a shear strength, a tensile strength, a strength in bending, an elastic modulus, a hardness, a derivative of the above mechanical properties and/or other properties that enable the propeller to provide vertical lift to the aircraft. The first propeller and the second propeller may experience extreme forces during operation, including thrust bending, centrifugal and aerodynamic twisting, torque bending and vibrations. The material of the first propeller and the second propeller can have a strength and rigidity that allows the propellers to retain their shape under forces exerted on the propellers during various modes of operation. In one embodiment, the first propeller and/or the second propeller are composed of a rigid composite. Additionally, the edges or tips of the blades can be lined with a metal to increase strength and rigidity.

During certain modes of operation, the first propeller and the second propeller may co-rotate in a counterclockwise direction. In other modes of operation, the first propeller and the second propeller can co-rotate in a clockwise direction. The stacked rotors (e.g., a starboard stacked rotor, a port stacked rotor) can rotate in opposite directions based on the mode of operation. For example, a starboard stacked rotor can rotate in a clockwise direction, and the port stacked rotor can rotate in a counterclockwise direction.

The stacked rotors can also rotate in the same or opposite directions. For example, the stacked rotor 2034 and the stacked rotor 2028 can both rotate in a clockwise direction during a mode of operation, while the stacked rotor 2030 and the stacked rotor 2036 can both rotate in a counterclockwise direction during the same mode of operation. The rotational direction of any particular stacked rotor may depend on the mode of operation.

Figure 22:
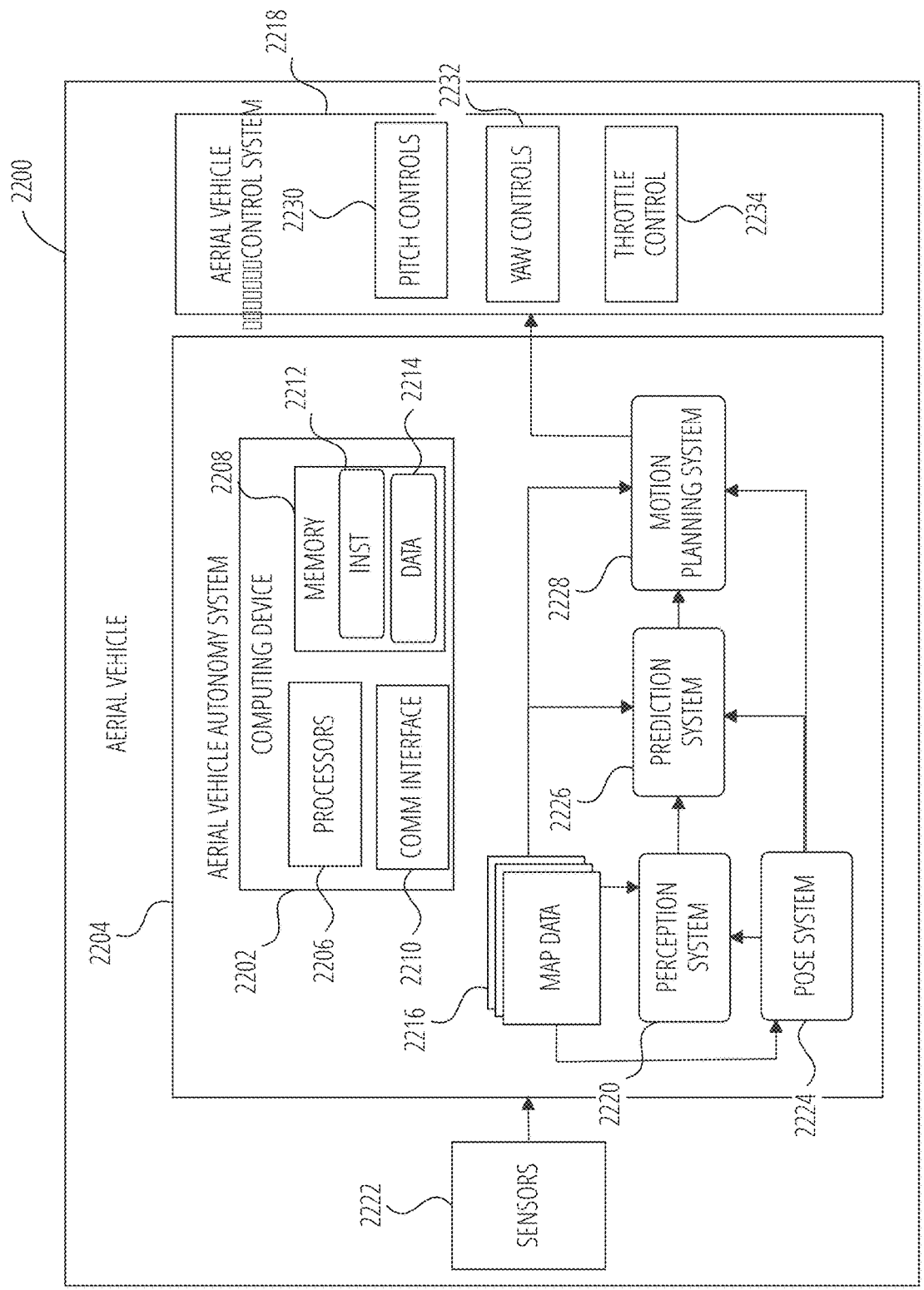
FIG. 22 is a diagrammatic representation of an autonomous vehicle system, in accordance with some examples.

FIG. 22 is a block diagram showing a system architecture of an aerial vehicle 2200, according to example aspects of the present disclosure. The aerial vehicle 2200 can be, for example, be an autonomous or semi-autonomous aerial vehicle. The aerial vehicle 2200 includes one or more sensors 2222, an aerial vehicle autonomy system 2204, and one or more aerial vehicle control system 2218.

The aerial vehicle autonomy system 2204 can be engaged to control the aerial vehicle 2200 or to assist in controlling the aerial vehicle 2200. In particular, the aerial vehicle autonomy system 2204 receives sensor data from the sensors 2222, attempts to comprehend the environment surrounding the aerial vehicle 2200 by performing various processing techniques on data collected by the sensors 2222 and generates an appropriate motion path through an environment. The aerial vehicle autonomy system 2204 can control the one or more aerial vehicle control system 2218 to operate the aerial vehicle 2200 according to the motion path.

The aerial vehicle autonomy system 2204 includes a perception system 2220, a prediction system 2226, a motion planning system 2228, and a pose system 2224 that cooperate to perceive the surrounding environment of the aerial vehicle 2200 and determine a motion plan for controlling the motion of the aerial vehicle 2200 accordingly.

Various portions of the aerial vehicle autonomy system 2204 receive sensor data from the sensors 2222. For example, the sensors 2222 may include remote-detection sensors as well as motion sensors such as an inertial measurement unit (IMU), one or more encoders, etc. The sensor data can include information that describes the location of objects within the surrounding environment of the aerial vehicle 2200, information that describes the motion of the vehicle, etc.

The sensors 2222 may also include one or more remote-detection sensors or sensor systems, such as a LIDAR, a RADAR, one or more cameras, etc. As one example, a LIDAR system of the sensors 2222 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, a RADAR system of the sensors 2222 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the sensors 2222 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the sensors 2222 can include a positioning system. The positioning system can determine a current position of the aerial vehicle 2200. The positioning system can be any device or circuitry for analyzing the position of the aerial vehicle 2200. For example, the positioning system can determine a position by using one or more of inertial sensors, a satellite positioning system such as a Global Positioning System (GPS), based on IP address, by using triangulation and/or proximity to network access points or other network components (e.g., cellular towers, Wi-Fi access points, etc.) and/or other suitable techniques. The position of the aerial vehicle 2200 can be used by various systems of the aerial vehicle autonomy system 2204.

Thus, the sensors 2222 can be used to collect sensor data that includes information that describes the location (e.g., in three-dimensional space relative to the aerial vehicle 2200) of points that correspond to objects within the surrounding environment of the aerial vehicle 2200. In some implementations, the sensors 2222 can be located at various different locations on the aerial vehicle 2200.

The pose system 2224 receives some or all of the sensor data from the sensors 2222 and generates vehicle poses for the aerial vehicle 2200. A vehicle pose describes the position (including altitude) and attitude of the vehicle. The position of the aerial vehicle 2200 is a point (or points) in a three-dimensional space. In some examples, the position is described by values for a set of Cartesian coordinates, although any other suitable coordinate system may be used. The attitude of the aerial vehicle 2200 generally describes the way in which the aerial vehicle 2200 is oriented at its position. In some examples, attitude is described by a yaw about the vertical axis, a pitch about a first horizontal axis and a roll about a second horizontal axis. In some examples, the pose system 2224 generates vehicle poses periodically (e.g., every second, every half second, etc.) The pose system 2224 appends time stamps to vehicle poses, where the time stamp for a pose indicates the point in time that is described by the pose. The pose system 2224 generates vehicle poses by comparing sensor data (e.g., remote sensor data) to map data 2216 describing the surrounding environment of the aerial vehicle 2200.

The pose system 2224 includes localizers and a pose filter. Localizers generate pose estimates by comparing remote sensor data (e.g., LIDAR, RADAR, etc.) to map data. The pose filter receives pose estimates from the one or more localizers as well as other sensor data such as, for example, motion sensor data from an IMU, encoder, odometer, etc. In some examples, the pose filter executes a Kalman filter or other machine learning algorithm to combine pose estimates from the one or more localizers with motion sensor data to generate vehicle poses. In some examples, localizers generate pose estimates at a frequency less than the frequency at which the pose system 2224 generates vehicle poses. Accordingly, the pose filter generates some vehicle poses by extrapolating from previous pose estimates.

The perception system 2220 detects objects in the surrounding environment of the aerial vehicle 2200 based on the sensor data, the map data 2216 and/or vehicle poses provided by the pose system 2224. The map data 2216, for example, may provide detailed information about the surrounding environment of the aerial vehicle 2200. The map data 2216 can provide information regarding: the identity and location of geographic entities, such as different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway; traffic control data (e.g., the location and instructions of signage, traffic lights, or other traffic control devices); and/or any other map data that provides information that assists the aerial vehicle autonomy system 2204 in comprehending and perceiving its surrounding environment and its relationship thereto. The perception prediction system 2226 uses vehicle poses provided by the pose system 2224 to place aerial vehicle 2200 environment.

The perception system 2220 determines state data for objects in the surrounding environment of the aerial vehicle 2200. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the aerial vehicle 2200; minimum path to interaction with the aerial vehicle 2200; minimum time duration to interaction with the aerial vehicle 2200; and/or other state information.

The perception system 2220 can determine state data for each object over a number of iterations. In particular, the perception system 2220 can update the state data for each object at each iteration. Thus, the perception system 2220 can detect and track objects, such as vehicles, that are proximate to the aerial vehicle 2200 over time.

The prediction system 2226 is configured to predict future positions for an object or objects in the environment surrounding the aerial vehicle 2200 (e.g., an object or objects detected by the perception system 2220). The prediction system 2226 can generate prediction data associated with objects detected by the perception system 2220. In some examples, the prediction system 2226 generates prediction data describing each of the respective objects detected by the perception system 2220.

Prediction data for an object can be indicative of one or more predicted future locations of the object. For example, the prediction system 2226 may predict where the object will be located within the next 5 seconds, 20 seconds, 200 seconds, etc. Prediction data for an object may indicate a predicted trajectory (e.g., predicted path) for the object within the surrounding environment of the aerial vehicle 2200. For example, the predicted trajectory (e.g., path) can indicate a path along which the respective object is predicted to travel over time (and/or the speed at which the object is predicted to travel along the predicted path). The prediction system 2226 generates prediction data for an object, for example, based on state data generated by the perception system 2220. In some examples, the prediction system 2226 also considers one or more vehicle poses generated by the pose system 2224 and/or the map data 2216.

The prediction system 2226 uses state data indicative of an object type or classification to predict a trajectory for the object. As an example, the prediction system 2226 can use state data provided by the perception system 2220 to determine that particular object (e.g., an object classified as a vehicle). The prediction system 2226 can provide the predicted trajectories associated with the object(s) to the motion planning system 2228.

The prediction system 2226 is also a goal-oriented prediction system that generates potential goals, selects the most likely potential goals and develops trajectories by which the object can achieve the selected goals. For example, the prediction system 2226 can include a scenario generation system that generates and/or scores the goals for an object and a scenario development system that determines the trajectories by which the object can achieve the goals. In some implementations, the prediction system 2226 can include a machine-learned goal-scoring model, a machine-learned trajectory development model, and/or other machine-learned models.

The motion planning system 2228 determines a motion plan for the aerial vehicle 2200 based at least in part on the predicted trajectories associated with the objects within the surrounding environment of the aerial vehicle 2200, the state data for the objects provided by the perception system 2220, vehicle poses provided by the pose system 2224, and/or the map data 2216. Stated differently, given information about the current locations of objects and/or predicted trajectories of objects within the surrounding environment of the aerial vehicle 2200, the motion planning system 2228 can determine a motion plan for the aerial vehicle 2200 that best navigates the aerial vehicle 2200 relative to the objects at such locations and their predicted trajectories on acceptable roadways.

The motion planning system 2228 evaluates cost functions and/or one or more reward functions for each of one or more candidate motion plans for the aerial vehicle 2200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 2228 can determine a total cost (e.g., a sum of the cost(s) and/or reward(s) provided by the cost function(s) and/or reward function(s)) of adhering to a particular candidate pathway. The motion planning system 2228 can select or determine a motion plan for the aerial vehicle 2200 based at least in part on the cost function(s) and the reward function(s). For example, the motion plan that minimizes the total cost can be selected or otherwise determined. The motion plan can be, for example, a path along which the aerial vehicle 2200 will travel in one or more forthcoming time periods. In some implementations, the motion planning system 2228 can be configured to iteratively update the motion plan for the aerial vehicle 2200 as new sensor data is obtained from the sensors 2222. For example, as new sensor data is obtained from the sensors 2222, the sensor data can be analyzed by the perception system 2220, the prediction system 2226, and the motion planning system 2228 to determine the motion plan.

Each of the perception system 2220, the prediction system 2226, the motion planning system 2228, and the pose system 2224, can be included in or otherwise a part of the aerial vehicle 2200 configured to determine a motion plan based on data obtained from the sensors 2222. For example, data obtained by the sensors 2222 can be analyzed by each of the perception system 2220, the prediction system 2226, and the motion planning system 2228 in a consecutive fashion in order to develop the motion plan. While FIG. 22 depicts elements suitable for use in an aerial vehicle autonomy system 2204 according to example aspects of the present disclosure, one of ordinary skill in the art will recognize that other vehicle autonomy systems can be configured to determine a motion plan for an autonomous aerial vehicle based on sensor data.

The motion planning system 2228 can provide the motion plan to aerial vehicle control system 2218 to execute the motion plan. For example, the aerial vehicle control system 2218 can include pitch control module 2230, yaw control module 2232, and a throttle control system 2234, each of which can include various vehicle controls (e.g., actuators or other devices or motors that control power) to control the motion of the aerial vehicle 2200. The various aerial vehicle control system 2218 can include one or more controllers, control devices, motors, and/or processors.

A throttle control system 2234 is configured to receive all or part of the motion plan and generate a throttle command. The throttle command is provided to an engine and/or engine controller, or other propulsion system component to control the engine or other propulsion system of the aerial vehicle 2200.

The aerial vehicle autonomy system 2204 includes one or more computing devices, such as the computing device 2202 which may implement all or parts of the perception system 2220, the prediction system 2226, the motion planning system 2228 and/or the pose system 2224. The example computing device 2202 can include one or more processors 2206 and one or more memory devices (collectively referred to as memory 2208). The processors 2206 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 2208 can include one or more non-transitory computer-readable storage mediums, such as Random-Access memory (RAM), Read Only memory (ROM), Electrically Erasable Programmable Read Only memory (EEPROM), Erasable Programmable Read Only memory (EPROM), flash memory devices, magnetic disks, etc., and combinations thereof. The memory 2208 can store instructions 2212 and instructions 2214 which can be executed by the processors 2206 to cause the aerial vehicle autonomy system 2204 to perform operations. The computing device 2202 can also include a communications interface 2210, which can allow the computing device 2202 to communicate with other components of the aerial vehicle 2200 or external computing systems, such as via one or more wired or wireless networks. Additional descriptions of hardware and software configurations for computing devices, such as the computing device 2202 are provided herein.

Figure 23:
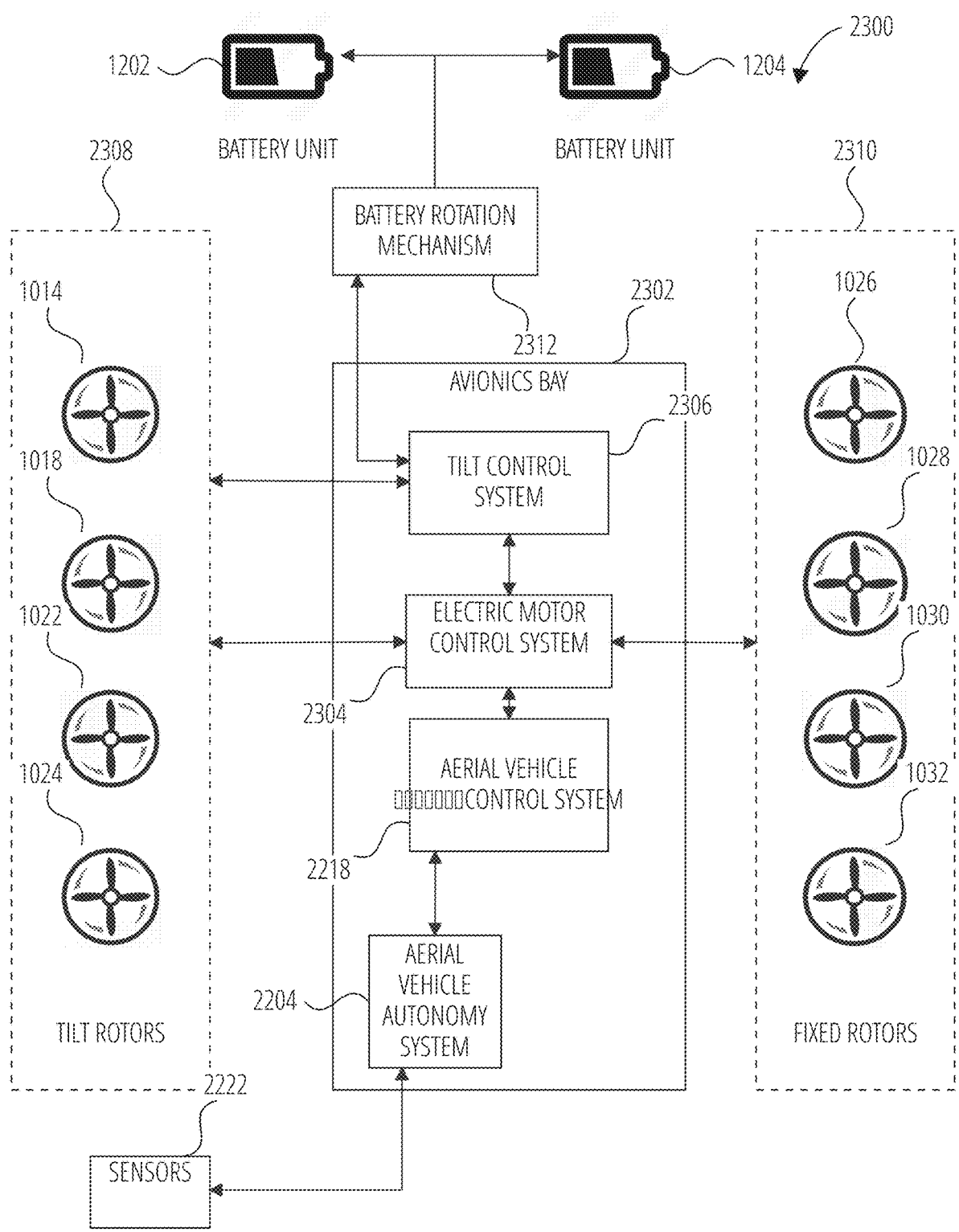
FIG. 23 illustrates an avionics system 2300 for an aerial vehicle 1000, in accordance with some examples.

FIG. 23 is a block diagram illustrating an avionics system 2300, including an aerial vehicle control system 2218, an aerial vehicle autonomy system 2204, an electric motor control system 2304 and tilt control system 2306, located within an avionics bay 2302 of one of the aerial vehicles (e.g., aerial vehicle 1000) discussed herein.

Turning to each of the respective components, the aerial vehicle autonomy system 2204 it is responsible for autonomous or semiautonomous operation of an aerial vehicle and is communicatively coupled to the sensors 2222 of the relevant aerial vehicle. The sensors 2222 may include LIDAR sensors, radar sensors and cameras, merely for example. The aerial vehicle autonomy system 2204 is communicatively coupled to the primary aerial vehicle control system 2218, which is in turn coupled to the various pitch, yaw and throttle controllers of the aerial vehicle. The aerial vehicle control system 2218 may further control electric motor control system 2304. The electric motor control system 2304 in turn controls electric motors of the aerial vehicle, including a number of rotors (or propulsors) of the aerial vehicle. These rotors include a set of tilt rotors 2308 (e.g., a tilt rotor 1014, a tilt rotor 1018, a tilt rotor 1022, and a tilt rotor 1024) and a set of fixed rotors 2310 (e.g., a fixed rotor 1026, a fixed rotor 1028, a fixed rotor 1030, and a fixed rotor 1032).

The aerial vehicle control system 2218 is furthermore communicatively coupled to and controls a tilt control system 2306. The tilt control system 2306 is responsible for the tilting or rotation of various components (e.g., tilt rotors 2308) of the aerial vehicle 1000 in order to provide enhanced control and flight stability of the aerial vehicle, as well as the implementation of countermeasures to mitigate the impact of an electrical or component failure of the aerial vehicle.

The tilt control system 2306 is communicatively coupled to, and controls, a battery rotation mechanism 2312 that is operatively able to move (e.g., rotate or laterally move) a battery unit 1202 and a battery unit 1204 of a battery system of the aerial vehicle. Further details regarding operations of the various systems and subsystems shown in FIG. 23 are described herein.

Glossary

"Aerial vehicle" refers to VTOL, CTOL, STOL and V/STOL aerial vehicles, and both manned and unmanned (e.g., drone) aerial vehicles.

"Airframe" includes fuselage, booms, nacelles, cowlings, fairings, airfoil surfaces, and landing gear, as well as accessories and controls that go with these structures. The rotors of a helicopter or VTOL may serve the same purpose as the wings of a plane, and may be considered part of the airframe.

"Battery system" refers to a system including both battery packs or cells, and a battery management system (BMS) that manages a rechargeable battery (cell or battery pack), such as by protecting the battery from operating outside its safe operating area, monitoring its state, calculating secondary data, reporting that data, controlling its environment, authenticating it and/or balancing it.

"Lift coefficient" refers to the lift coefficient is a number that aerodynamicists use to model complex dependencies of shape, inclination, and some flow conditions on lift. The lift coefficient Cl is equal to the lift L divided by the quantity: density r times half the velocity V squared times the wing area A.

"Tilt jet" refers to a propulsor that tilts its turbojet or turbofans, for example, vertically for VTOL and then tilts them forwards for horizontal wing-borne flight, while the main wing, pylon or frame supporting the propulsor remains fixed in place.

"Tilt propulsor" refers to a tilt rotor or a tilt jet.

"Tilt rotor" refers to a propulsor that tilts its propellers or rotors, for example, vertically for VTOL and then tilts them forward for horizontal wing-borne flight, relative to the main wing, pylon or frame supporting the propulsor.

"Tilt wing" refers to a wing that has its propulsors, propellers or rotors fixed to a wing and tilts a whole assembly to, for example, transition between vertical and horizontal flight or address other flight demands (such as a failure condition).

What is claimed is:

1. A vertical lift rotor propulsor assembly comprising:
    a wing-mounted boom having a casing with a casing profile;
    a first propeller blade having a blade profile that corresponds substantially to at least a portion of the casing profile of the casing of the boom, the first propeller blade having a vertically-aligned axis of rotation; and
    a drive mechanism at least partially housed within the boom and to which the first propeller blade is rotatably mounted, the drive mechanism to operationally translate the first propeller blade vertically between a stowed position in the boom and a deployed position, wherein, when in the stowed position, a lower surface of the first propeller blade conforms to a recess in the boom and an upper surface of the first propeller blade is substantially flush with an upper surface of the casing of the boom, and, wherein, in the deployed position, the first propeller blade is extended a determined distance above the casing of the boom and can be rotated in order to provide vertical lift.

2. The vertical lift rotor propulsor assembly of claim 1, wherein the casing defines a recess having a shape substantially corresponding to the blade profile of the first propeller blade, the recess operationally to receive the first propeller blade when in the stowed position.

3. The vertical lift rotor propulsor assembly of claim 2, wherein the recess is defined within a surface of the casing.

4. The vertical lift rotor propulsor assembly of claim 1, wherein the drive mechanism is to rotate the first propeller blade in the deployed position in order to provide vertical lift to an aircraft.

5. The vertical lift rotor propulsor assembly of claim 1, including a second propeller blade having a blade profile that also corresponds substantially to at least a portion of the casing profile of the casing of the boom, the first and second propeller blades being rotatably mounted in a diametrically opposite arrangement to the drive mechanism.

6. The vertical lift rotor propulsor assembly of claim 1, wherein the drive mechanism comprises an electric motor and an extendable driveshaft that is operationally driven by the electric motor, the extendable driveshaft being extendable and retractable relative the boom to move the first propeller blade between the stowed position and the deployed position.

7. The vertical lift rotor propulsor assembly of claim 6, wherein the extendable driveshaft is operationally to raise the first propeller blade above an upper surface of the casing of the boom when translating the first propeller blade to the deployed position.

8. The vertical lift rotor propulsor assembly of claim 7, wherein the extendable driveshaft is operationally to lower the first propeller blade below an upper surface of the casing of the boom when translating the first propeller blade to the stowed position.

9. The vertical lift rotor propulsor assembly of claim 1, wherein the determined distance that the first propulsor blade is raised from the casing is equal to or exceeds a chord length of the first blade.

10. The vertical lift rotor propulsor assembly of claim 1, wherein the drive mechanism comprises a telescoping driveshaft.

11. A method of manufacturing a conformal prop-rotor assembly,
    the method comprising:
    providing a wing-mountable boom having a casing having a casing profile;
    forming at least one propeller blade to have a blade profile that corresponds substantially to at least a portion of the casing profile of the casing of the boom, the at least one propeller blade having a vertically-aligned axis of rotation in use;
    securing the at least one propeller blade to a drive mechanism; and
    mounting the drive mechanism within the boom, the drive mechanism operationally to rotate the at least one propeller blade to provide vertical lift to an aerial vehicle, and the drive mechanism further operationally to translate the at least one propeller blade vertically between a stowed position in the boom and a deployed position, wherein, when in the stowed position, a lower surface of the at least one propeller blade conforms to a recess in the boom and an upper surface of the at least one propeller blade is substantially flush with an upper surface of the casing of the boom and, wherein, in the deployed position, the at least one propeller blade is extended a determined distance above the casing of the boom.

12. The method of claim 11, wherein the forming of the at least one propeller blade comprises modifying at least one of rake, skew, or sweep of the at least one propeller blade to modify the blade profile to correspond substantially to the portion of the casing profile of the casing of the boom.

13. The method of claim 11, comprising forming a recess within the casing of the boom to operationally receive the at least one propeller blade when in the stowed position, the recess having a shape corresponding substantially to a shape of the at least one propeller blade.

14. The method of claim 11, including forming a second propeller blade having a blade profile that corresponds to a second portion of the casing profile of the casing of the boom.

15. The method of claim 11, wherein the drive mechanism comprises an electric motor and an extendable driveshaft, and the method comprises forming the extendable driveshaft to operationally extend the at least one propeller blade a determined distance from an upper surface of the casing of the boom.

16. The method of claim 11, wherein the drive mechanism comprises a telescoping driveshaft.

* * * * *